United States Patent
Yanagawa

(10) Patent No.: US 7,436,742 B2
(45) Date of Patent: Oct. 14, 2008

(54) OPTICAL RECORDING DEVICE AND ABERRATION CORRECTION METHOD

(75) Inventor: Naoharu Yanagawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 534 days.

(21) Appl. No.: 10/973,425

(22) Filed: Oct. 27, 2004

(65) Prior Publication Data
US 2005/0094535 A1 May 5, 2005

(30) Foreign Application Priority Data
Oct. 31, 2003 (JP) ............................. 2003-372219

(51) Int. Cl.
*G11B 5/00* (2006.01)
(52) U.S. Cl. ................. 369/47.53; 369/44.33
(58) Field of Classification Search ........................ None
See application file for complete search history.

(56) References Cited

U.S. PATENT DOCUMENTS

| 7,301,869 | B2 * | 11/2007 | Sasaki et al. | 369/47.53 |
| 2002/0105878 | A1 * | 8/2002 | Ogata et al. | 369/53.19 |
| 2003/0174615 | A1 | 9/2003 | Kim et al. | |
| 2006/0062098 | A1 * | 3/2006 | Miyake et al. | 369/44.11 |

FOREIGN PATENT DOCUMENTS

| JP | 2001-250256 A | 9/2001 |
| JP | 2002-288832 A | 10/2002 |
| JP | 2003-109239 A | 4/2003 |
| JP | 2003-132573 A | 5/2003 |

OTHER PUBLICATIONS

Shinichi Nagahara et al., "Development of the optical pickup of DVD-R/RW (5) drives", Pioneer R&D, Mar. 31, 2003, pp. 40-55, vol. 13. (Partial translation attached).

* cited by examiner

*Primary Examiner*—Wayne Young
*Assistant Examiner*—Adam R. Giesy
(74) *Attorney, Agent, or Firm*—Foley & Lardner LLP

(57) ABSTRACT

An optical recording device includes an optical pickup, an asymmetry detection circuit, and a microcomputer. The optical pickup corrects an aberration of an object lens based on an aberration correction value using a liquid crystal panel in the optical pickup, irradiates a laser beam of multiple stages of recording powers on an optical disk to form marks, and then reproduces the formed marks with a reproduction power. The asymmetry detection circuit detects amplitudes of RF signals of the marks reproduced by the optical pickup, calculates amplitude central values such that asymmetry takes a predetermined value, and determines an optimum recording power. The microcomputer performs spherical aberration correction to change a spherical aberration correction value from an initial value such that the optimum recording power takes a minimum value.

13 Claims, 11 Drawing Sheets

OPTICAL RECORDING DEVICE AND ABERRATION CORRECTION METHOD

BACKGROUND OF THE INVENTION

1) Field of the Invention

The present invention relates to an optical recording device that irradiates a laser beam on an optical recording medium to record information in the optical recording medium and an aberration correction method.

2) Description of the Related Art

When information is recorded in an optical recording medium like a laser disk (LD), a compact disk (CD), or a digital versatile disk (DVD), or when the information is reproduced from the optical recording medium, aberrations may occur such as spherical aberration, comatic aberration, or astigmatism. The spherical aberration is caused by fluctuations in thickness of a transparent substrate protecting the optical recording medium or by a fluctuation in the parameters of optical components. The comatic aberration is caused by warping of the optical recording medium, by fluctuation of parameters or adjustment deviation in optical components, or the like. The astigmatism is caused by deviation, inclination, or the like in accuracy of optical components, assembly errors, or deviations in optical axes. When a diameter of a laser beam on the optical recording medium increases due to these aberrations, correct information cannot be recorded in the optical recording medium, and recorded information cannot be reproduced correctly. Thus, various conventional techniques for correcting aberrations have been devised.

In a first conventional technique, taking notice of the fact that, when a spherical aberration occurs, a tracking servo gain decreases according to a degree of the spherical aberration, a spherical aberration correction value is transitioned such that the tracking servo gain increases. In other words, taking notice of the fact that a tracking error signal decreases when a spherical aberration is large and that a tracking signal increases when a spherical aberration is small, a spherical aberration correction value is transitioned. More specifically, from a disturbance superimposed signal, which is obtained by adding a disturbance signal (a signal having a predetermined frequency) to a tracking error signal and is used for control of a tracking servo system, only a band component of the disturbance signal is extracted to obtain a servo residual error value. Then, a ratio of the servo residual error value with respect to an amplitude of the disturbance signal is calculated, and this ratio is set as a tracking servo gain. When the optical recording medium rotates once, spherical aberration correction is performed by adding a predetermined value to a present spherical aberration correction value to calculate a tracking servo gain, and the calculated tracking servo gain and an immediately preceding tracking servo gain are compared. Then, a spherical aberration correction value with a larger tracking servo gain is determined as a new spherical aberration correction value (e.g., see Japanese Patent Application Laid-Open No. 2001-250256).

In a second conventional technique, taking notice of the fact that, when changes in levels are measured of a land pre-pit (LPP) signal, an RF (Radio Frequency) signal, a main push-pull (MPP) signal in an unrecorded state at the time when comatic aberration correction is operated at disk tilt 1 deg, and as a result of the measurement, when the comatic aberration correction is performed optimally, the levels of the respective signals take maximum values, and sensitivity of the signal levels is highest in the LPP signal and decreases in an order of the RF signal and the MPP signal. The RF signal is monitored in a recorded optical recording medium and ROM optical recording medium, and the LPP signal is monitored in an unrecorded DVD-R (Digital Versatile Disk Recordable) and DVD-RW (Digital Versatile Disk ReWritable) optical recording media to determine a comatic aberration correction value such that a signal amplitude of the monitored signal is maximized (e.g., see PIONEER R&D 2003 Vol. 13 "1. DVD-R/RW(R5) pickup development").

However, a change in the tracking servo gain is small, and sensitivity thereof is low. In addition, tracking servo gains are different in an unrecorded optical recording medium and a recorded optical recording medium. Therefore, as an example, in the first conventional technique in which a spherical aberration correction value is determined such that a tracking servo gain is maximized, there is a problem in that a spherical aberration cannot be corrected with high accuracy.

Since the tracking servo gain changes subtly depending on a position of a recording medium, it is difficult to detect the subtle change accurately. Therefore, in the first conventional technique in which a spherical aberration correction value is determined such that a tracking servo gain is maximized, there is a problem in that spherical aberration correction according to a subtle change in the tracking servo gain cannot be performed. Although it is possible to detect a subtle change in the tracking servo gain if high-performance components are used, cost increases in this case.

Moreover, the tracking error signal provides information on only a tracking direction (radial direction). Therefore, in the first conventional technique in which a spherical aberration correction value is determined using a tacking servo gain that is calculated based on the tracking error signal, there is a problem in that correction cannot be performed of an aberration giving influence in a tangential direction.

In addition, as indicated in the second conventional technique, when a tilt correction amount by a liquid crystal element approaches "0," signal changes decrease in the LPP signal, the RF signal, and the MPP signal. In other words, when the comatic aberration decreases and the tilt correction amount decreases, changes in signal amplitudes of the respective signals become flat. In the second conventional technique, taking notice of the sensitivity of a signal level, the LPP signal, which has a large change in a signal due to a correction amount for the comatic aberration is larger compared with the other signals, is used in the DVD-R and the DVD-RW in which the LPP signal is present. Further, the RF signal having a largest change next to the LPP signal is used in an optical recording medium in which the LPP signal is not present. However, in the case of any of the signals, the signal change decreases excessively when the correction amount of the comatic aberration decreases. Therefore, in the LPP signal, the RF signal, or the MPP signal adopted in the second conventional technique, there is a problem in that, when the tilt correction amount decreases, it is difficult to detect a change in a signal correctly, and an accurate comatic aberration correction value cannot be determined.

SUMMARY OF THE INVENTION

It is an object of the present invention to solve at least the problems in the conventional technology.

An optical recording device according to another aspect of the present invention includes an optical pickup unit. The optical pickup unit includes a laser beam source that generates a laser beam, an optical system that irradiates the laser beam on an optical recording medium, and an aberration correction unit that corrects wavefront aberrations of the optical system and the optical recording medium. The optical recording device also includes a detecting unit that detects an optimum recording power of the laser beam with respect to the optical recording medium; and a controlling unit that controls the aberration correcting unit such that the optimum recording power to be detected by the detecting unit is at a minimum.

An aberration correction method according to still another aspect of the present invention is for an optical recording device that corrects wavefront aberrations of an optical system for irradiating a laser beam generated from a laser bean source on an optical recording medium. The aberration correction method includes detecting an optimum recording power of the laser beam with respect to the optical recording medium; and correcting the wavefront aberrations such that the optimum recording power to be detected at the detecting is at a minimum.

The other objects, features, and advantages of the present invention are specifically set forth in or will become apparent from the following detailed description of the invention when read in conjunction with the accompanying drawings.

DETAILED DESCRIPTION

Exemplary embodiments of an optical recording device and an aberration correction method according to the invention will be hereinafter explained in detail in reference to the accompanying drawings.

An optical recording device and an aberration correction method of the present invention will be explained using FIGS. 1 and 2. The optical recording device is configured to correct spherical aberrations, comatic aberrations, and astigmatism. The characteristics of the optical recording device and the aberration correction method will be explained with spherical aberration correction as an example.

Figure 1:
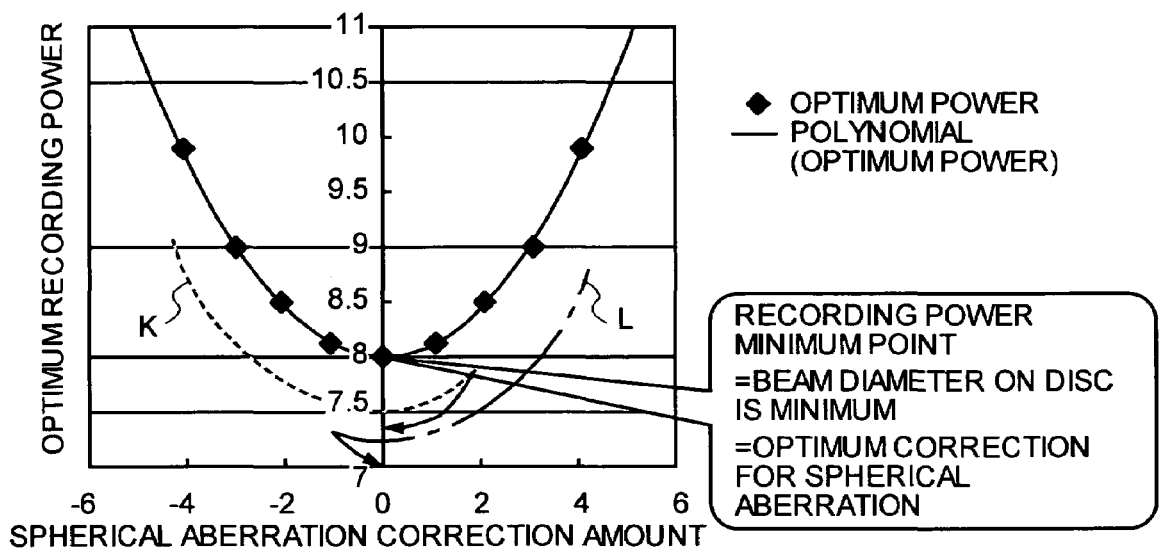
FIG. 1 is an ideal graph of an ideal relation between a spherical aberration correction amount and an optimum recording power.

FIG. 1 is an ideal graph that shows how the ideal spherical aberration correction amount changes with optimum recording power of an optical recording medium. Ideal indicates a case in which, when the spherical aberration is "0," a laser beam to be irradiated on the optical recording medium is optimized. An optimum power of a laser beam is adjusted to be minimized when a thickness of a transparent substrate of the recording medium (cover layer thickness) takes a standard value and the spherical aberration is set to "0" by initial adjustment at the time of manufacturing. Thus, in FIG. 1, the optimum recording power takes a minimum value when the spherical aberration correction amount is "0," and the optimum recording power increases as the spherical aberration correction amount increases to the positive side or the negative side. In this case, it is indicated that when the spherical aberration correction amount is increased or decreased, the spherical aberration increases, and the optimum recording power increases. In other words, since the spherical aberration has increased, a diameter of a laser beam to be irradiated on the optical recording medium increases, and a power density decreases. Thus, a larger power is required when a mark is formed. In other words, if the optimum recording power while the spherical aberration correction amount is changed is smaller than the optimum recording power in the spherical aberration correction amount before change, the diameter of the laser beam to be irradiated on the optical recording medium has decreased, and optimum spherical aberration correction is performed.

Comatic aberration correction and astigmatism correction are also corrections for focusing the laser beam to be irradiated on the optical recording medium. Therefore, in the comatic aberration correction and the astigmatism correction, the diameter of the laser beam to be irradiated on the optical recording medium decreases, and the optimum recording power decreases by performing appropriate correction.

The graph shown in FIG. 1 indicates an ideal relation between a spherical aberration correction amount and an optimum recording power with respect to the optical recording medium. As shown in FIG. 2, for example, due to manufacturing fluctuation in various components like a liquid crystal element that corrects a manufacturing error, a substrate thickness error, or a spherical aberration of a transparent substrate of the optical recording medium, the optimum recording power may be minimized at the spherical aberration correction amount of "+2." In other words, the graph itself showing a relation between the optimum recording power and the spherical aberration correction amount is offset to the positive side or the negative side or changes to an asymmetrical graph in which increments in the positive or negative directions are different. However, in both the cases of FIGS. 1 and 2, if the optimum recording power while the spherical aberration correction amount is changed is smaller than the optimum recording power before change, then the diameter of the laser beam to be irradiated on the optical recording medium has decreased, and optimum spherical aberration correction is performed.

In the optical recording device of the present invention, taking notice of the face that, when an aberration correction value is changed, if an optimum recording power after the change is smaller than an optimum recording power before the change, it can be judged that a diameter of a laser beam is reduced and optimum aberration correction is performed. Further, the optimum recording power is used as a parameter for determining an aberration correction value of wavefront aberrations (spherical aberration, comatic aberration, and astigmatism) of an object lens.

The optimum recording power is a parameter that can always be detected in an optical recording device that records information in an optical recording medium using a laser beam. In other words, the optimum recording power does not depend on the optical recording medium unlike the LPP signal that is present only in a DVD-R and a DVD-RW. Therefore, the invention is applicable to optical recording devices using all optical recording media in which information is recorded using a laser beam, for example, optical recording media like a compact disc, a DVD-RAM (Digital Versatile Disk Random Access Memory), a DVD-R, a DVD-RW, a DVD+R, a DVD-RW, a blue ray system, an optical card, and an optical tape.

In addition, since an aberration correction value is changed such that the optimum recording power takes a minimum value to determine an aberration correction value, a laser beam is always irradiated with a minimum recording power. In general, since a life of a laser is proportional to a power of the laser, an effect of prolonging a life of a laser device can also be obtained.

A first embodiment of the present invention will be explained using FIGS. 1 to 4. Embodiments described below will be explained with a DVD-R, a DVD-RW, and the like, in which address information indicating a position on an optical disk where information should be recorded and a reference signal for generating a clock signal to be used for recording and reproduction operations are formed as land pre-pits, as examples of optical recording media (hereinafter, "optical disks").

Figure 3:
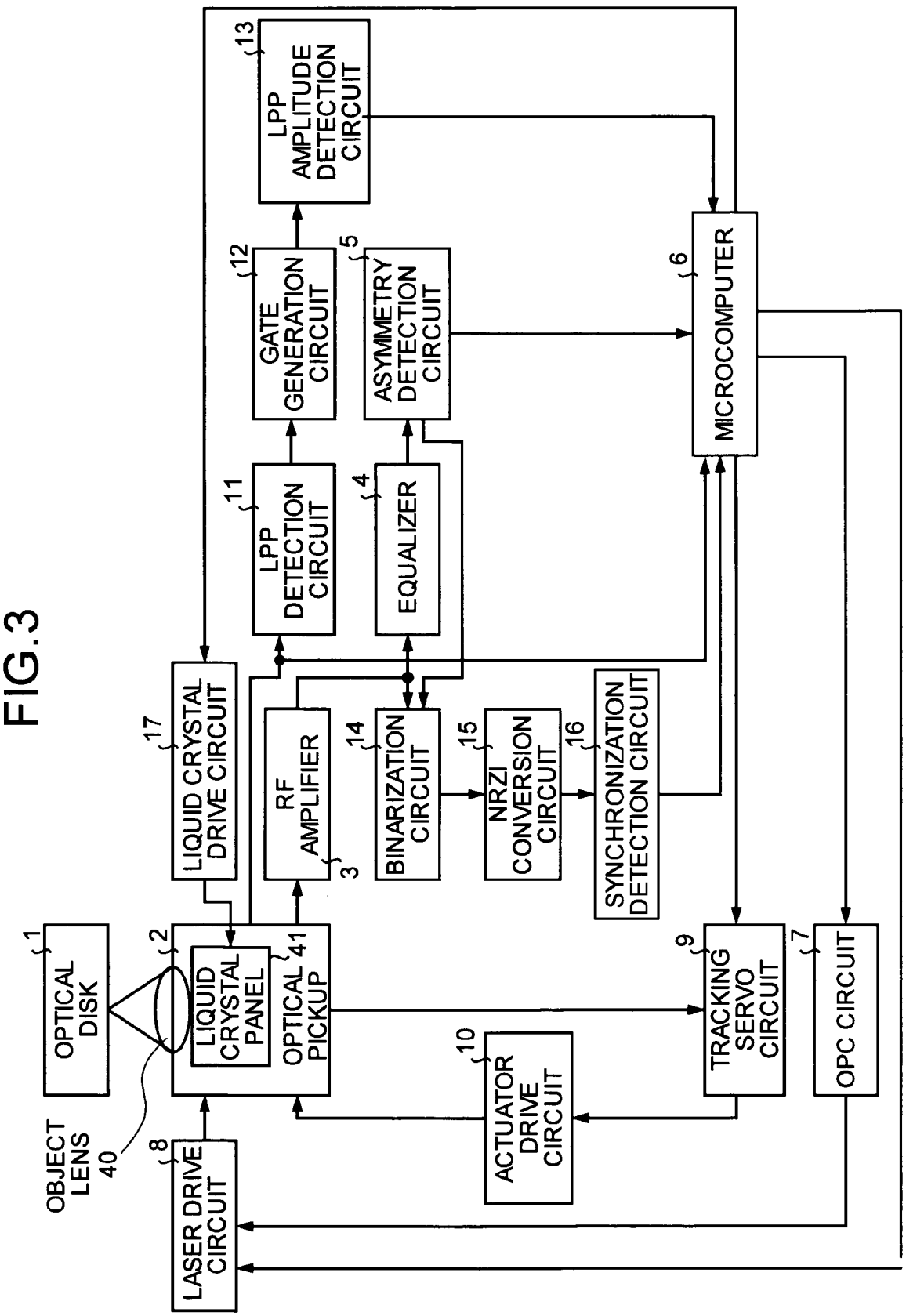
FIG. 3 is a block diagram of a structure of an optical recording device according to a first embodiment of the present invention.

FIG. 3 is a block diagram of an optical recording device according to the first embodiment of the present invention. This optical recording device includes an optical pickup 2, an RF amplifier 3, an equalizer 4, an asymmetry detection circuit 5, a microcomputer 6, an OPC (Optimum Power Control) circuit 7, a laser drive circuit 8, a tracking servo circuit 9, an actuator drive circuit 10, an LPP detection circuit 11, a gate generation circuit 12, an LPP amplitude detection circuit 13, a binarization circuit 14, an NRZI (Non Return to Zero Invert) conversion circuit 15, and a synchronization detection circuit 16.

The optical pickup 2 includes a semiconductor laser (not shown) serving as a laser beam source, an object lens 40 serving as an optical system, a liquid crystal panel 41 serving as an aberration correcting unit, a photo detector (not shown) that detects a reflected light amount (reflection intensity) of reflected light from an optical disk 1, and the like. The optical pickup 2 generates a laser beam according to a write strategy signal or a reproduction power from the laser beam source and irradiates the generated laser beam on the optical disk 1 via the liquid crystal panel 41, the object lens 40, and the like. The liquid crystal panel 41 is driven by a liquid crystal drive circuit 17 and corrects aberrations like spherical aberration, comatic aberration, and astigmatism by creating a required reflectivity distribution in the panel according to voltage control by the liquid crystal drive circuit 17. In addition, the optical pickup 2 generates a main push-pull (MPP) signal, a tracking error signal, and an RF signal based on a detection output of the photo detector that detects reflected light from the optical disk 1. The MPP signal is outputted to the LPP detection circuit 11 and the microcomputer 6, the tracking error signal is outputted to the tracking servo circuit 9, and the RF signal is outputted to the RF amplifier 3.

The LPP detection circuit 11 detects a land pre-pit signal (LPP signal) from the MPP signal inputted from the optical pickup 2. A group serving as an information track, in which recording information should be recorded, and a land serving as a guide track for guiding a laser beam to the group are formed in the optical disk 1. An LPP is formed in the land not to be opposed to the land across the group. In addition, the optical disk 1 wobbles the group at a frequency to be a reference for rotation speed of the optical disk 1. The MPP signal includes a frequency component of this wobbling and a frequency component of the LPP. The LPP detection circuit 11 detects a signal component of the LPP from the MPP signal.

The gate generation circuit 12 applies gating to the signal of the LPP detected by the LPP detection circuit 11 and outputs only the LPP signal to the LPP amplitude detection circuit 13. The LPP amplitude detection circuit 13 detects an amplitude of the LPP signal and outputs the detected amplitude of the LPP signal to the microcomputer 6.

The RF amplifier 3 amplifies the RF signal inputted from the optical pickup 2 and outputs an amplified RF signal to the binarization circuit 14 and the equalizer 4.

The binarization circuit 14 binarizes the amplified RF signal with an amplitude central value of an optimum recording power as a slice level and outputs a binarized value to the NRZI conversion circuit 15. The NRZI conversion circuit 15 converts the binarized value into an NRZI signal and outputs the converted NRZI signal to the synchronization detection circuit 16. The synchronization detection circuit 16 detects a synchronization pattern (in this case, a mark of 14T) out of the NRZI signal and notifies the microcomputer 6 that the synchronization pattern has been detected.

When information is recorded in the optical disk 1, the microcomputer 6 modulates the recorded information by a ratio of 8/16, generates an NRZI signal, and outputs the generated NRZI signal to the laser drive circuit 8. When the information recorded in the optical disk 1 is reproduced, the microcomputer 6 controls the laser drive circuit 8 to output a reproduction power. The microcomputer 6 detects a wobbling signal from the MPP signal inputted from the optical pickup 2, acquires pre-information in advance based on the detected wobbling signal, the LPP signal detected by the LPP amplitude detection circuit 13, and the synchronization pattern detected by the synchronization detection circuit 16. From this pre-information, the microcomputer 6 acquires address information or the like, which indicates a position of the optical disk 1 where the information should be recorded or reproduced. The microcomputer 6 outputs the acquired address information to the tracking servo circuit 9.

When the optical disk 1 is inserted in the optical recording device and the optical recording device enters a recording start mode, the microcomputer 6 outputs an OPC instruction to the OPC circuit 7. Moreover, the microcomputer 6 outputs an instruction to move the optical pickup 2 to a power calibration area (OPC area), which is an area for trial writing in the optical disk 1, with a carriage servo circuit (not shown) to execute OPC. In addition, the microcomputer 6 determines a spherical aberration correction value based on the optimum recording power inputted from the asymmetry detection circuit 5 and outputs the determined spherical aberration correction value to the liquid crystal drive circuit 17. The microcomputer 6 controls the respective components of the optical recording device collectively.

The tracking servo circuit 9 extracts a DC component and a high-frequency component of the tracking error signal outputted from the optical pickup 2. Then, the tracking servo circuit 9 supplies the DC component of the tracking error signal to the carriage servo circuit to drive a slide motor (not shown). In addition, the tracking servo circuit 9 outputs the high-frequency component of the tracking error signal to the actuator drive circuit 10. The tracking servo circuit 9 drives the carriage servo circuit and the actuator drive circuit 10 based on the address information from the microcomputer 6. Consequently, the optical pickup 2 can move on the optical disk 1 and irradiate a laser beam on the optical disk 1 from a leading position where information should be recorded or reproduced. The actuator derive circuit 10 is driven by the tracking servo circuit 9 and controls a laser beam outputted from the optical pickup 2 to trace the track of the optical disk 1.

When the OPC instruction is inputted, the OPC circuit 7 outputs NRZI signals corresponding to 3T and 14T, where T is a period of one channel clock that is a unit length corresponding to a bit interval defined by a recording format in recording record information, and a recording power of the NRZI signals to the laser drive circuit 8. After continuously outputting the NRZI signals corresponding to 3T and 14T a predetermined number of times, the OPC circuit 7 changes the recording power. In other words, the OPC circuit 7 uses recording powers of plural stages to output NRZI signals for forming marks with a minimum mark length 3T and a maximum mark length 14T, which are recorded continuously in the optical recording medium a predetermined number of times with the recording powers of the respective stages, to the laser drive circuit 8. In addition, after outputting the NRZI signals for forming the marks of 3T and 14T, the OPC circuit 7 outputs a signal for reading out the marks to the laser drive circuit 8. The marks to be outputted by the OPC circuit 7 are not limited to 3T and 14T but may be any marks. Preferably, the marks are at least two marks with different lengths.

At the time of recording information in the optical disk 1, the laser drive circuit 8 generates a write strategy signal having a designated recording power from the inputted NRZI signals and outputs the generated write strategy signal to the optical pickup 2. In addition, at the time of reproducing the information recorded in the optical disk 1, the laser drive circuit 8 outputs a reproduction power to the optical pickup 2.

The equalizer 4 increases a high-frequency gain of the amplified RF signal inputted from the RF amplifier 3. In the amplified RF signal inputted from the RF amplifier 3, a high-frequency amplitude is reduced due to a frequency characteristic of the optical pickup 2. The equalizer 4 increases the high-frequency gain of the amplified RF signal to correct the high-frequency amplitude due to the frequency characteristic of the optical pickup 2 and outputs the corrected amplified RF signal to the asymmetry detection circuit 5.

The asymmetry detection circuit 5 measures amplitudes resulting from the continuous recording in 3T and 14T and calculates amplitude central values of the respective amplitudes such that asymmetry takes a predetermined value. In general, a diameter of a laser beam irradiated by an optical pickup for recording is larger than a diameter of a laser beam irradiated by an optical pickup of a standard reproduction machine. In addition, a diameter of a laser beam varies subtly depending on a type of an optical disk, a reproduction MTF (Modulation Transfer Function) of an optical pickup for recording, and the like. Thus, it is desirable to determine an optimum recording power such that asymmetry is 0 to 5% at the time when information is reproduced by the standard reproduction machine. Therefore, the asymmetry is set to any value in a range of −5 to 15% at the time when the asymmetry detection circuit 5 calculates amplitude central values resulting from the continuous recording at 3T and 14T. To obtain the same characteristic as the standard reproduction machine, it is also possible to provide an optical pickup dedicated for reproduction, which is the same as that in the standard reproduction machine, to record information using the optical pickup 2, and to reproduce 3T and 14T using the optical pickup dedicated for reproduction. In addition, a correction function, which causes an RF signal to have a characteristic equivalent to the RF signal reproduced by using the optical pickup of the standard reproduction machine, may be given to the equalizer 4.

The asymmetry detection circuit 5 detects an optimum recording power with which asymmetry of 3T and 14T takes a predetermined value and two amplitude central values are equal. Then, the asymmetry detection circuit 5 outputs the detected optimum recording power to the microcomputer 6 and, at the same time, outputs an amplitude central value of the detected optimum recording power to the binarization circuit 14 as a slice level.

The liquid crystal drive circuit 17 generates a voltage to be applied to the liquid crystal panel in the optical pickup 2 based on the spherical aberration correction value from the microcomputer 6 and outputs the voltage to the optical pickup 2.

Next, a spherical aberration correcting operation of the optical recording device of the first embodiment will be explained with reference to a flowchart of FIG. 4.

When the optical disk 1 is inserted in the optical recording device, the microcomputer 6 sets a spherical aberration correction value to an initial value (step S100) and outputs this initial value to the liquid crystal drive circuit 17. In the graph shown in FIG. 1 or 2, when it is assumed that a result of adding a predetermined value α1 (0<α1) to a value in a range having a negative inclination, that is, an initial value as a first step width is a spherical aberration correction value, the initial value of the spherical aberration correction value is assumed to be a value at which an optimum recording power of the spherical aberration correction value is smaller than an optimum recording power corresponding to the initial value. The liquid crystal drive circuit 17 generates a voltage to be applied to the liquid crystal panel in the optical pickup 2 based on the spherical aberration correction value (initial value) from the microcomputer 6 and outputs the generated voltage to the optical pickup 2.

The microcomputer 6 causes the OPC circuit 7 to execute OPC processing (step S110). More specifically, the microcomputer 6 outputs an OPC instruction to start the OPC processing to the OPC circuit 7 and outputs address information to the tracking servo circuit 9. The tracking servo circuit 9 drives the carriage servo circuit and the actuator drive circuit 10 based on the address information from the microcomputer 6. Consequently, the optical pickup 2 moves to an OPC area that is an area for trial writing on the optical disk 1. The OPC circuit 7 uses recording powers of plural stages to output NRZI signals, which continuously form marks of 3T and 14T on the optical disk 1 for a predetermined number of times with the recording powers of the respective stages, to the laser drive circuit 8. The laser drive circuit 8 generates a write strategy signal having the recording power designated by the inputted NRZI signals and outputs the generated write strategy signal to the optical pickup 2. The optical pickup 2 outputs a laser beam based on the write strategy signal to the OPC area of the optical disk 1. Consequently, the marks of 3T and 14T are formed in the OPC area of the optical disk 1 with a plurality of different recording powers.

When the formation of the marks of 3T and 14T with the different recording powers, the laser drive circuit 8 outputs a reproduction power for reading out the recorded marks of 3T and 14T to the optical pickup 2 according to a designation of the OPC circuit 7. The optical pickup 2 irradiates a laser beam of the reproduction power on the optical disk 1 and generates RF signals from reflected light of the laser beam. The asymmetry detection circuit 5 detects amplitudes of the RF signals of 3T and 14T that are amplified by the RF amplifier 3 and for which high-frequency amplitudes are corrected by the equalizer 4. Then, the asymmetry detection circuit 5 detects a recording power, which is asymmetrical and at which two amplitude central values are equal, of predetermined values of 3T and 14T and outputs the detected recording power to the microcomputer 6 as an optimum recording power.

The microcomputer 6 stores the optimum recording power obtained by the OPC processing in a memory X in the microcomputer 6 (step S120). Next, the microcomputer 6 adds the predetermined value $\alpha1$ to the present spherical aberration correction value to change the spherical aberration correction value (step S130). In other words, the spherical aberration correction value is the spherical aberration correction value at the time when the optimum recording power stored in the memory X in the microcomputer 6 is acquired plus $\alpha1$.

The microcomputer 6 causes the OPC circuit 7 to execute the OPC processing and acquires an optimum recording power at the time when the spherical aberration correction value is the initial value plus $\alpha1$ (step S140). Since the OPC processing is the same as that at step S110, operations of the OPC processing will not be explained.

The microcomputer 6 compares the acquired optimum recording power and the optimum recording power stored in the memory X in the microcomputer 6 (step S150). If the acquired optimum recording power is smaller than the optimum recording power stored in the memory X in the microcomputer 6 (Yes at step S150), the microcomputer 6 repeats the operations of storing the acquired optimum recording power in the memory X in the microcomputer 6, causing the OPC circuit 7 to execute the OPC processing after the predetermined value $\alpha1$ is added to the present spherical aberration correction value to change the spherical aberration correction value, and comparing the optimum recording power acquired by the OPC processing and the optimum recording power stored in the memory X in the microcomputer 6 until the acquired optimum recording power becomes equal to or larger than the optimum recording power stored in the memory X in the microcomputer 6 (steps S120 to S150). In other words, the microcomputer 6 increases the spherical aberration correction value by increments of the predetermined value $\alpha1$ and acquires the optimum recording power with the OPC processing every time the spherical aberration correction value is increased to detect a minimum value of the optimum recording power.

If the acquired optimum recording power becomes equal to or larger than the optimum recording power stored in the memory X in the microcomputer 6 (No at step S150), the microcomputer 6 stores the acquired optimum storing power in the memory X in the microcomputer 6 (step S160). Then, the microcomputer 6 subtracts a predetermined value $\alpha2$ ($0<\alpha2<\alpha1$), which is a second step width smaller than the value $\alpha1$, from the present spherical aberration correction value to change the spherical aberration correction value (step S170). In other words, the microcomputer 6 changes the spherical aberration correction value to the spherical aberration correction value at the time when the optimum recording power stored in the memory X in the microcomputer 6 is obtained minus $\alpha2$.

The microcomputer 6 causes the OPC circuit 7 to execute the OPC processing with the changed spherical aberration correction value to acquire an optimum recording power (step S180). The microcomputer 6 compares the acquired optimum recording power and the optimum recording power stored in the memory X in the microcomputer 6 (step S190). If the acquired optimum recording power is smaller than the optimum recording power stored in the memory X in the microcomputer 6 (No at step S190), the microcomputer 6 repeats the operations of storing the acquired optimum recording power in the memory X in the microcomputer 6, causing the OPC circuit 7 to execute the OPC processing after changing the spherical aberration correction value by subtracting the predetermined value $\alpha2$ from the present spherical aberration correction value, and comparing the optimum recording power acquired by the OPC processing and the optimum recording power stored in the memory X in the microcomputer 6 until the acquired optimum recording power becomes equal to or larger than the optimum recording power stored in the memory X in the microcomputer 6 (steps S160 to S190). In other words, the microcomputer 6 decreases the spherical aberration correction value by increments of the predetermined value $\alpha2$ smaller than the value $\alpha1$ to detect a minimum value of the optimum recording power.

If the acquired optimum recording power becomes equal to or larger than the optimum recording power stored in the memory X in the microcomputer 6 (Yes at step S190), the microcomputer 6 adds the predetermined value $\alpha2$ to the present spherical aberration correction value to change the spherical aberration correction value (step S200). According to the processing as described above, the microcomputer 6 changes the spherical aberration correction amount along a broken line K in FIG. 1 or FIG. 2 to converge the spherical aberration correction amount to a spherical aberration correction value corresponding to the minimum optimum recording power.

As described above, in the first embodiment, after correcting aberrations in the object lens 40 and the optical disk 1 based on an aberration correction value using the liquid crystal panel 41 serving as the aberration correcting unit in the optical pickup 2, and irradiating laser beams of recording power of plural stages on the optical disk 1 to form the marks of 3T and 14T, the optical pickup 2 serving as the optical pickup unit reproduces the formed marks with reproduction power. The asymmetry detection circuit 5 serving as the detecting unit detects amplitudes of RF signals of 3T and 14T reproduced by the optical pickup 2 and calculates amplitude central values such that asymmetry takes a predetermined value to determine an optimum recording power. Then, the microcomputer 6 serving as the controlling unit performs spherical aberration correction to change a spherical aberration correction value from an initial value such that optimum recording power takes a minimum value. It is possible to set recording power finely, and the spherical aberration correction value is determined with this recording power as a parameter. Thus, the spherical aberration correction can be performed more accurately than calculating maximum values of a tracking servo gain, an LPP signal, an RF signal, an MPP signal, and the like.

In addition, since the minimum value of the optimum recording power is used as a parameter for the spherical aberration correction, spherical aberrations in a radial direction and a tangential direction of a laser beam irradiated on the optical disk 1 can be corrected. In the above explanation, the initial value of the spherical aberration correction value is set to a value in a range having a negative inclination in the graph shown in FIG. 1 or FIG. 2. However, the initial value of the spherical aberration correction value may be set in a range having a positive inclination. In this case, the microcomputer 5 changes the spherical aberration correction value along a locus L indicated by an alternate long and short dash line in FIG. 1 or FIG. 2. First, the microcomputer 5 subtracts the value $\alpha1$ from the spherical aberration correction value and, then, adds the value $\alpha2$ to the spherical aberration correction value.

Moreover, the microcomputer 6 preferably operates with firmware. The OPC processing is executed by the optical recording device and is generally incorporated in the firmware already. Therefore, the spherical aberration correction can be performed only with changes to the firmware.

According to a second embodiment of the present invention, a microcomputer causes an OPC circuit to execute OPC processing to detect optimum recording power from a stored present spherical aberration correction value without setting an initial value to perform spherical aberration correction. In other words, the microcomputer 6 first distinguishes whether a present spherical aberration correction amount is in a range having a negative inclination or in a range having a positive inclination on the graph shown in FIG. 1 or FIG. 2. The microcomputer 6 also determines whether the predetermined value $\alpha 1$ is subtracted from or added to the spherical aberration correction amount based on a result of the distinction. Since a structure of an optical recording device according to the second embodiment is the same as the structure of the optical recording device according to the first embodiment shown in FIG. 3, an explanation of the structure will be omitted.

A spherical aberration correction operation of the optical recording device according to the second embodiment will be explained with reference to flowcharts in FIGS. 5 and 6. Since the OPC processing is the same as step S100 of the first embodiment, an explanation of an operation of the OPC processing will be omitted.

Figure 5:
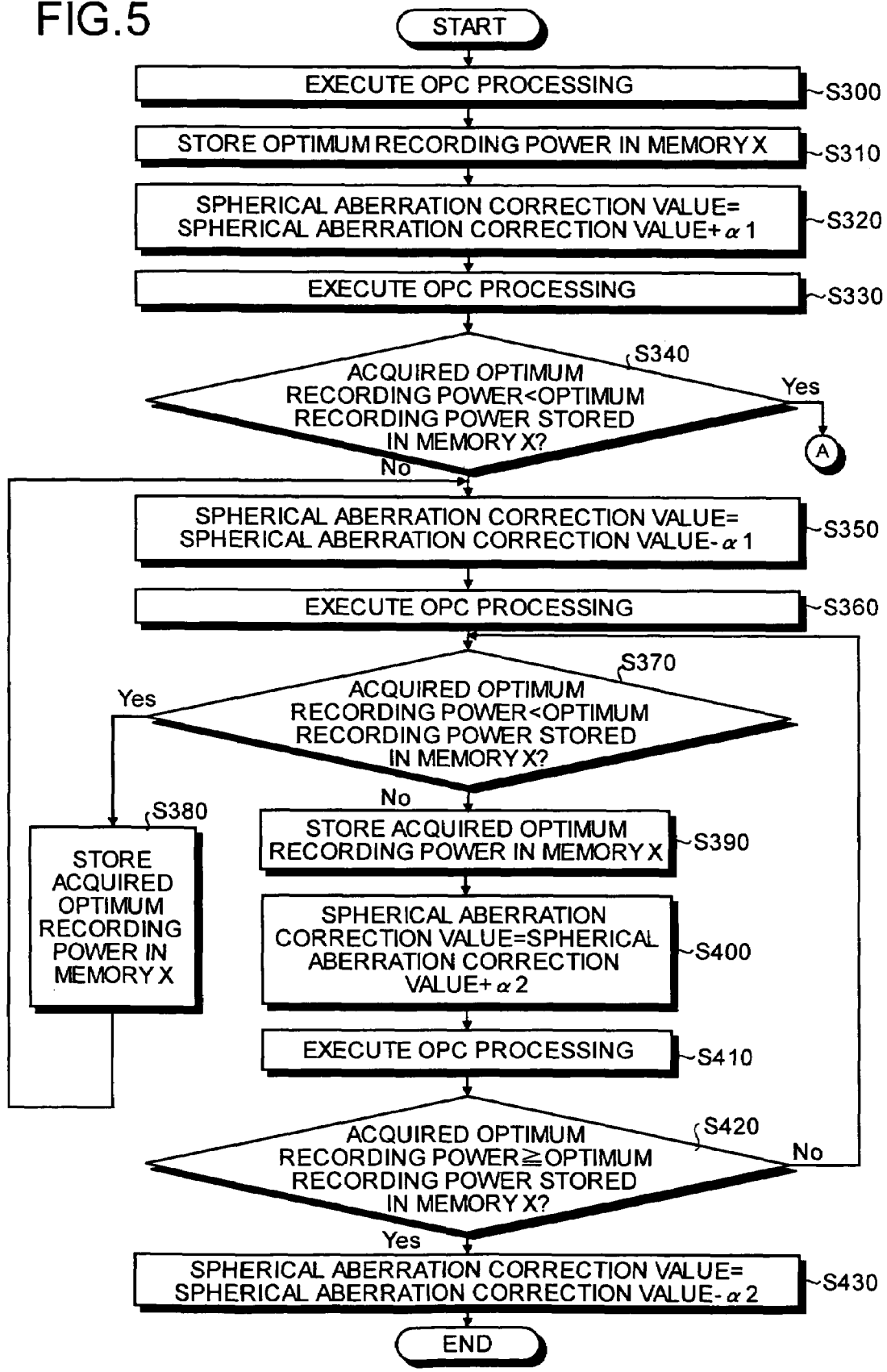
FIG. 5 is a flowchart for explaining a spherical aberration correction operation performed by an optical recording device according to a second embodiment of the present invention.

When the optical disk 1 is inserted in the optical recording device, the microcomputer 6 causes the OPC circuit 7 to execute the OPC processing (step S300 in FIG. 5). The microcomputer 6 stores optimum recording power obtained by the OPC processing in the memory X in the microcomputer 6 (step S310 in FIG. 5). The microcomputer 6 adds a predetermined value $\alpha 1$ ($0<\alpha 1<1$) to a stored present spherical aberration correction value to change the spherical aberration correction value (step S320 in FIG. 5).

The microcomputer 6 causes the OPC circuit 7 to execute the OPC processing with the changed spherical aberration correction value to acquire an optimum recording power (step S330 in FIG. 5). The microcomputer 6 compares the acquired optimum recording power and the optimum recording power stored in the memory X in the microcomputer 6 (step S340 in FIG. 5). If the acquired optimum recording power is equal to or larger than the optimum recording power stored in the memory X in the microcomputer 6 (No at step S340 in FIG. 5), the microcomputer 6 subtracts the predetermined value $\alpha 1$ from the spherical aberration correction value to change the spherical aberration correction value (step S350 in FIG. 5). The first time the subtraction is made, the microcomputer 6 may subtract $2\alpha 1$. For each subsequent subtraction, a spherical aberration correction value is changed by subtracting the predetermined value $\alpha 1$ from the spherical aberration correction value obtained at the time when the optimum recording power stored in the memory X in the microcomputer 6 is calculated.

The microcomputer 6 causes the OPC circuit 7 to execute the OPC processing with the changed spherical aberration correction value to acquire an optimum recording power (step S360 in FIG. 5). The microcomputer 6 compares the acquired optimum recording power and the optimum recording power stored in the memory X in the microcomputer 6 (step 370 in FIG. 5). If the acquired optimum recording power is smaller than the optimum recording power stored in the memory X in the microcomputer 6 (Yes at step S370 in FIG. 5), the microcomputer 6 repeats the operations of storing the acquired optimum recording power in the memory X in the microcomputer 6, executing the OPC processing after subtracting the predetermined value $\alpha 1$ from the present spherical aberration correction value to change the spherical aberration correction value, and comparing the optimum recording power acquired by the OPC processing until the acquired optimum recording power becomes equal to or larger than the optimum recording power stored in the memory X in the microcomputer 6 (steps S350 to S380 in FIG. 5). In other words, the microcomputer 6 decreases the spherical aberration correction value by increments of the predetermined value $\alpha 1$ and acquires an optimum recording power every time the spherical aberration correction value is decreased to detect a minimum value of the optimum recording power.

If the obtained optimum recording power becomes equal to or larger than the optimum recording power stored in the memory X in the microcomputer 6 (No at step S370 in FIG. 5), the microcomputer 6 stores the acquired optimum storing power in the memory X in the microcomputer 6 (step S390 in FIG. 5). Then, the microcomputer 6 adds a predetermined value $\alpha 2$ ($0<\alpha 2<\alpha 1$) smaller than the value $\alpha 1$ to the present spherical aberration correction value to change the spherical aberration correction value (step S400 in FIG. 5). In other words, the microcomputer 6 changes the optimum recording power stored in the memory X in the microcomputer 6 by adding $\alpha 2$ to the spherical aberration correction value at the time when the optimum recording power stored in the memory X in the microcomputer 6 is acquired.

The microcomputer 6 causes the OPC circuit 7 to execute the OPC processing with the changed spherical aberration correction value to acquire an optimum recording power (step S410 in FIG. 5). The microcomputer 6 compares the acquired optimum recording power and the optimum recording power stored in the memory X of the microcomputer 6 (step S420 in FIG. 5). If the acquired optimum recording power is smaller than the optimum recording power stored in the memory X in the microcomputer 6 (No at step S420 in FIG. 5), the microcomputer 6 repeats the operations of storing the acquired optimum recording power in the memory X in the microcomputer 6 and comparing the optimum recording power, which is acquired by causing the OPC circuit 7 to execute the OPC processing after adding the predetermined value $\alpha 2$ to the present spherical aberration correction value to change the spherical aberration correction value, and the optimum recording power stored in the memory X in the microcomputer 6 until the acquired optimum recording power becomes equal to or larger than the optimum recording power stored in the memory X in the microcomputer 6 (steps S390 to S420 in FIG. 5). In other words, the microcomputer 6 increases the spherical aberration correction value by increments of the predetermined value $\alpha 2$ to detect a minimum value of the optimum recording power.

If the acquired optimum recording power becomes equal to or larger than the optimum recording power stored in the memory X in the microcomputer 6 (Yes at step S420 in FIG. 5), the microcomputer 6 subtracts the predetermined value $\alpha 2$ from the present spherical aberration correction value to change the spherical aberration correction value (step S430 in FIG. 5). According to the processing as described above, the microcomputer 6 changes the spherical aberration correction amount along the locus L indicated by an alternate long and short dash line in FIG. 1 or FIG. 2 to converge the spherical aberration correction amount to a spherical aberration correction value corresponding to the minimum optimum recording power.

Figure 6:
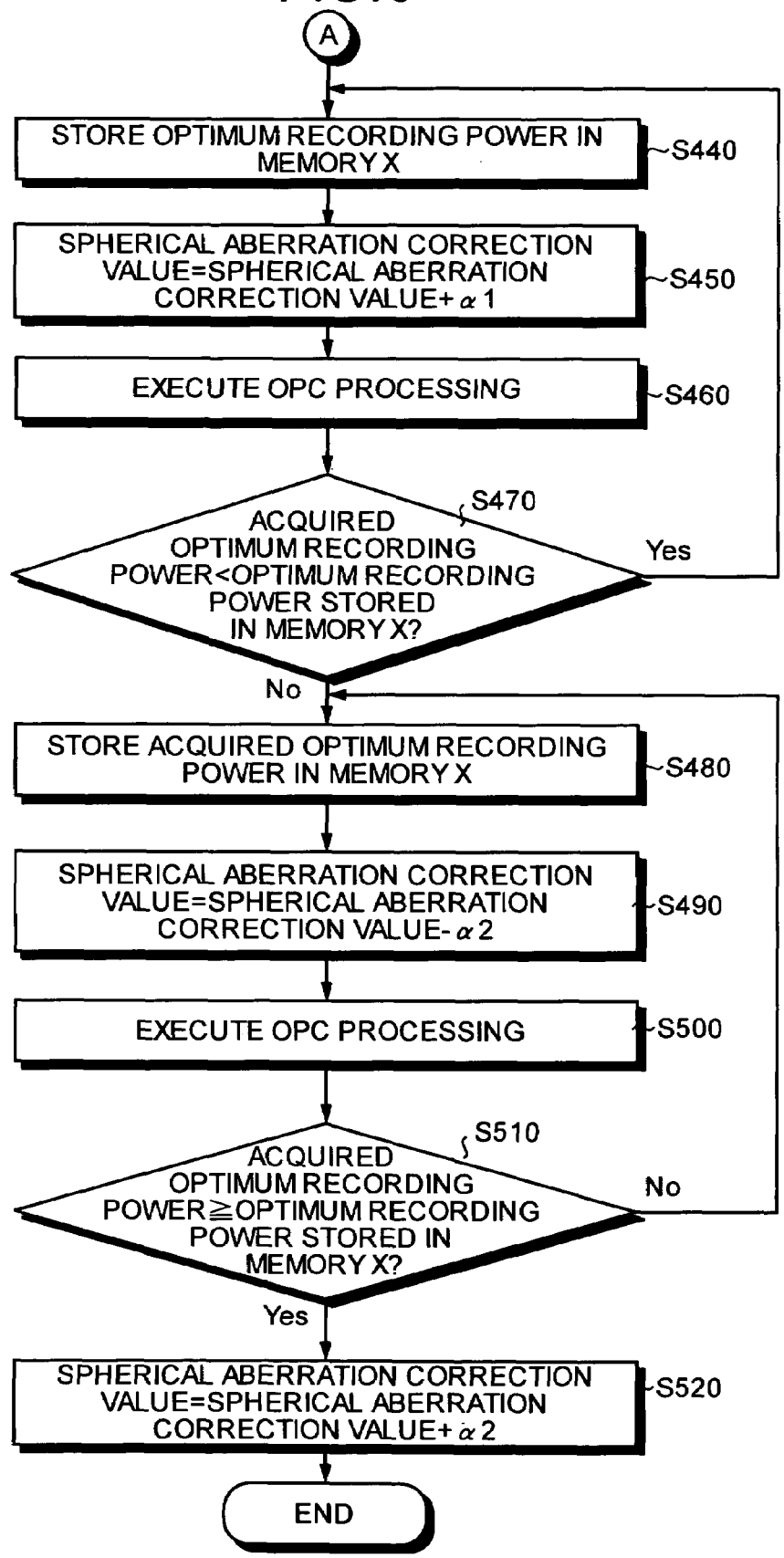
FIG. 6 is a flowchart for explaining a spherical aberration correction operation performed by the optical recording device according to the second embodiment.

On the other hand, if the optimum recording power, which is acquired by causing the OPC circuit 7 to execute the OPC processing with the spherical aberration correction value obtained by adding the predetermined value $\alpha 1$ to the spherical aberration correction value at the time when the microcomputer 6 first caused the OPC circuit 7 to execute the OPC processing, is smaller than the optimum recording power stored in the memory X in the microcomputer 6 (Yes at step S340 in FIG. 5), then the microcomputer 6 stores the acquired optimum recording power in the memory X in the microcomputer 6 (step S440 in FIG. 6). The microcomputer 6 adds the predetermined amount α1 to the present spherical aberration correction value to change the spherical aberration correction value (step S450 in FIG. 6).

The microcomputer 6 causes the OPC circuit 7 to execute the OPC processing with the changed spherical aberration correction value to acquire an optimum recording power (step S460 in FIG. 6). The microcomputer 6 compares the acquired optimum recording power and the optimum recording power stored in the memory X in the microcomputer 6 (step S470 in FIG. 6). If the acquired optimum recording power is smaller than the optimum recording power stored in the memory X in the microcomputer 6 (Yes at step S470 in FIG. 6), the microcomputer 6 repeats the operations of storing the acquired optimum recording power in the memory X in the microcomputer 6, causing the OPC circuit 7 to execute the OPC processing after adding the predetermined value α1 to the present spherical aberration correction value to change the spherical aberration correction value, and comparing the optimum recording power acquired by the OPC processing and the optimum recording power stored in the memory X in the microcomputer 6 until the acquired optimum recording power becomes equal to or larger than the optimum recording power stored in the memory X in the microcomputer 6 (steps S440 to S470 in FIG. 6). In other words, the microcomputer 6 increases the spherical aberration correction value by increments of the predetermined value al and acquires an optimum recording power every time the spherical aberration correction value is increased to detect a minimum value of the optimum recording power.

If the acquired optimum recording power becomes equal to or larger than the optimum recording power stored in the memory X in the microcomputer 6 (No at step S470 in FIG. 6), the microcomputer 6 stores the acquired optimum recording power in the memory X in the microcomputer 6 (step S480 in FIG. 6). Then, the microcomputer 6 subtracts the predetermined value α2 from the present spherical aberration correction value to change the spherical aberration correction value (step S490 in FIG. 6). In other words, the microcomputer 6 changes the spherical aberration correction value by subtracting α2 from the spherical aberration correction value at the time when the optimum recording power stored in the memory X in the microcomputer 6 is acquired.

The microcomputer 6 causes the OPC circuit 7 to execute the OPC processing with the changed spherical aberration correction value to acquire an optimum recording power (step S500 in FIG. 6). The microcomputer 6 compares the acquired optimum recording power and the optimum recording power stored in the memory X in the microcomputer 6 (step S510 in FIG. 6). If the acquired optimum recording power is smaller than the optimum recording power stored in the memory X in the microcomputer 6 (No at step S510 in FIG. 6), the microcomputer 6 repeats the operation of storing the acquired optimum recording power in the memory X in the microcomputer 6, causing the OPC circuit 7 to execute the OPC processing after subtracting the predetermined value α2 from the present spherical aberration correction value to change the spherical aberration correction value, and comparing the optimum recording power acquired by the OPC processing with the optimum recording power stored in the memory X in the microcomputer 6 until the acquired optimum recording power becomes equal to or larger than the optimum recording power stored in the memory X in the microcomputer 6 (steps S480 to S510 in FIG. 6). In other words, the microcomputer 6 decreases the spherical aberration correction value by increments of the predetermined value α2 to detect a minimum value of the optimum recording power.

If the acquired optimum recording power becomes equal to or larger than the optimum recording power stored in the memory X in the microcomputer 6 (Yes at step S510 in FIG. 6), the microcomputer 6 adds the predetermined value α2 to the present spherical aberration correction value to change the spherical aberration correction value (step S520 in FIG. 6). According to the processing as described above, the microcomputer 6 changes the spherical aberration correction amount along the broken line K in FIG. 1 or FIG. 2 to converge the spherical aberration correction amount to a spherical aberration correction value corresponding to the minimum optimum recording power.

Figure 2:
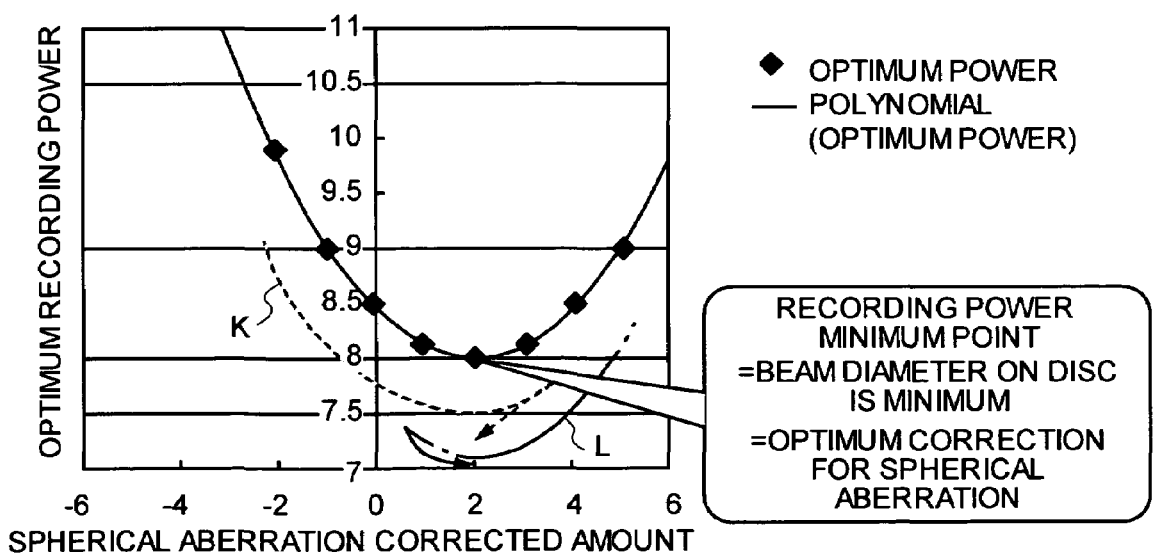
FIG. 2 is a graph of an example of an actual relation between a spherical aberration correction amount and an optimum recording power.

As described above, in the second embodiment, the microcomputer 6 first distinguishes whether a present spherical aberration correction amount is in a range having a negative inclination or in a range having a positive inclination on the graph shown in FIG. 1 or FIG. 2 and determines whether the predetermined value α1 is subtracted from or added to the spherical aberration correction amount based on a result of the distinction. Consequently, in the second embodiment, it is unnecessary to set an initial value of a spherical aberration correction value. In addition, the microcomputer 6 executes spherical aberration correction from a stored present spherical aberration correction value such that optimum recording power is minimized. Thus, when the present spherical aberration correction value is near a spherical aberration correction value at which the optimum recording power is minimized, the spherical aberration correction can be performed in a shorter processing time, and an area used as an OPC area decreases compared with the first embodiment.

In addition, a spherical aberration correction value is determined as a parameter with a recording power that can be set finely. Thus, the spherical aberration correction can be performed more accurately than calculating maximum values of a tracking servo gain, an LPP signal, an RF signal, an MPP signal, and the like.

In the second embodiment, the asymmetry detection circuit 5 detects optimum recording power and outputs the detected optimum recording power to the microcomputer 6. However, it is also possible that the asymmetry detection circuit 5 calculates only an amplitude central value with asymmetry of a predetermined value and outputs the amplitude central value to the microcomputer 6, and the microcomputer 6 detects the optimum recording power.

A third embodiment according to the present invention relates to a modification of the first and the second embodiments. In the first embodiment and the second embodiment, an optimum recording power is determined from asymmetry at the time when marks of 3T and 14T are formed. However, the optimum recording power is not limited to the asymmetry at the time when marks of 3T and 14T are formed. For example, the optimum recording power may be set as a recording power with which an amplitude of a reproduction RF signal takes a maximum value, a recording power with which a jitter value of the reproduction RF signal is minimized, or a recording power with which an error rate is minimized.

In addition, in the first embodiment and the second embodiment, when the optical disk is inserted in the optical recording device, the microcomputer 6 performs the OPC processing by changing a spherical aberration correction value in an OPC area to determine a spherical aberration correction value such that optimum recording power is minimized. However, as the optical disk 1, there are optical disks in which various kinds of information are recorded on the optical disks (hereinafter, "disk information") such as a pre-write section in the case of a DVD-R and ATIP information in the case of a CD. When the optimum recording power at the time of recording is included in disk information of the optical disk 1, it is also possible that the microcomputer 6 causes the CPC circuit 7 to execute the OPC processing with a stored present spherical aberration correction value to acquire an optimum recording power, and to perform the spherical aberration correction processing shown in the flowchart in FIG. 4 or FIG. 5 only when the acquired optimum recording power is larger than optimum recording power in the disk information.

More specifically, when the optical disk 1 is inserted in the optical recording device, the microcomputer 6 reads out the disk information in the optical disk 1 and judges whether optimum recording power information is included in the disk information. When the optimum recording power information is included, the microcomputer 6 causes the OPC circuit 7 to execute the OPC processing with the present spherical aberration correction value to acquire the optimum recording power. The microcomputer 6 compares the acquired optimum recording power and the optimum recording power information. When the acquired optimum recording power is equal to or smaller than the optimum recording power information as a result of the comparison, the microcomputer 6 judges that optimum spherical aberration correction has already been performed and starts a recording operation with the acquired optimum recording power. When the result of the comparison shows that the acquired optimum recording power is larger than the optimum recording power information, the microcomputer 6 judges that spherical aberration correction is necessary and performs the spherical aberration correction processing shown in the flowchart in FIG. 4 or FIG. 5. In this way, the microcomputer 6 can perform the spherical aberration correction without wasting the OPC area by using in advance the optimum recording power information recorded in the optical disk 1.

At the time of a recording operation for recording information in an optical disk, a technique called running OPC compares a reflection intensity of an optimum recording power obtained by OPC processing and a reflection intensity at the time when marks are formed at the time of the recording operation and records information in the optical disk while correcting the optimum recording power obtained by the OPC processing based on a result of this comparison. According to a fourth embodiment, a spherical aberration caused by an error in thickness of a transparent substrate of an optical disk is corrected using a change in the recording power corrected by this running OPC.

Figure 7:
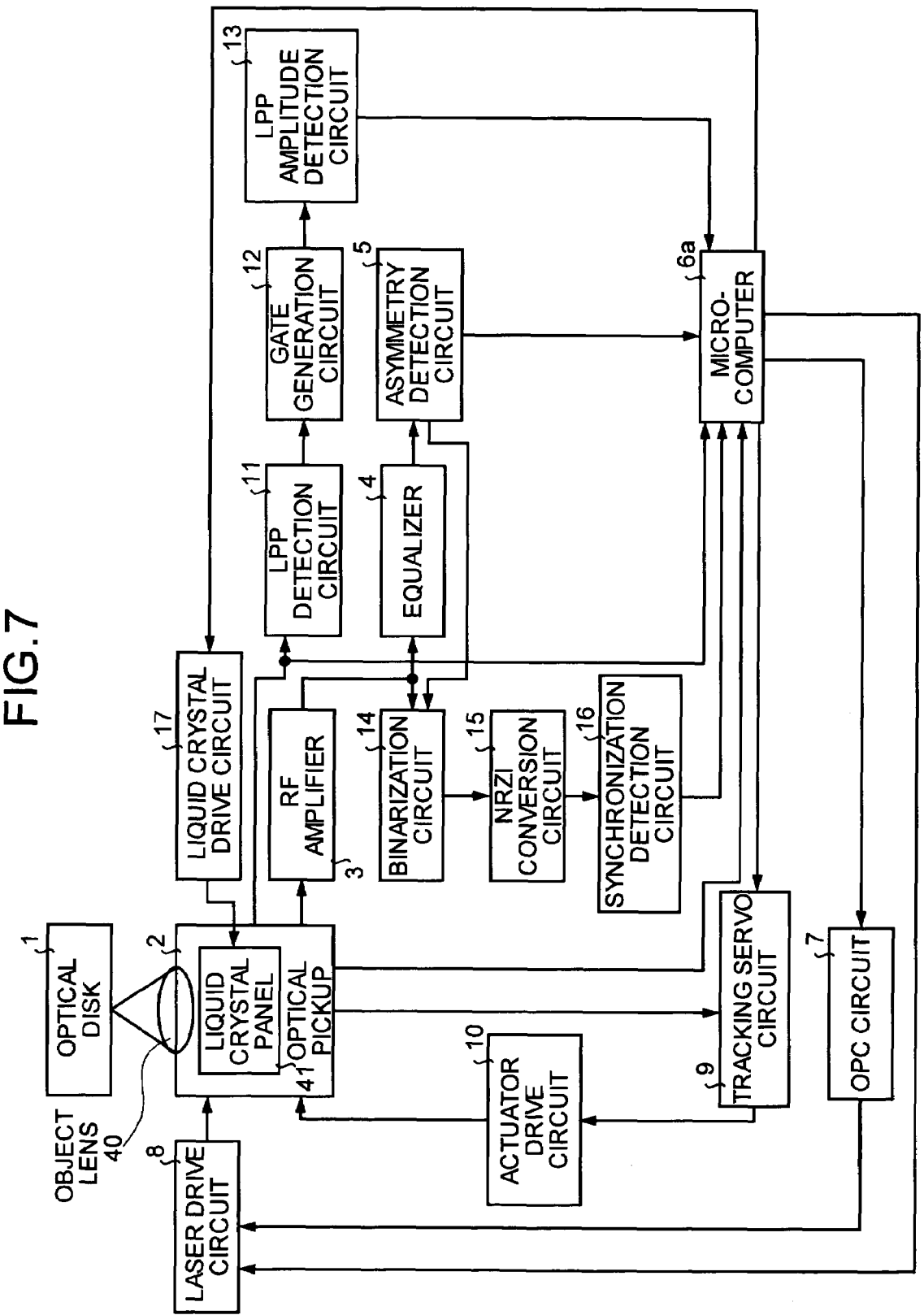
FIG. 7 is a block diagram of an optical recording device according to a fourth embodiment of the present invention.
Figure 8:
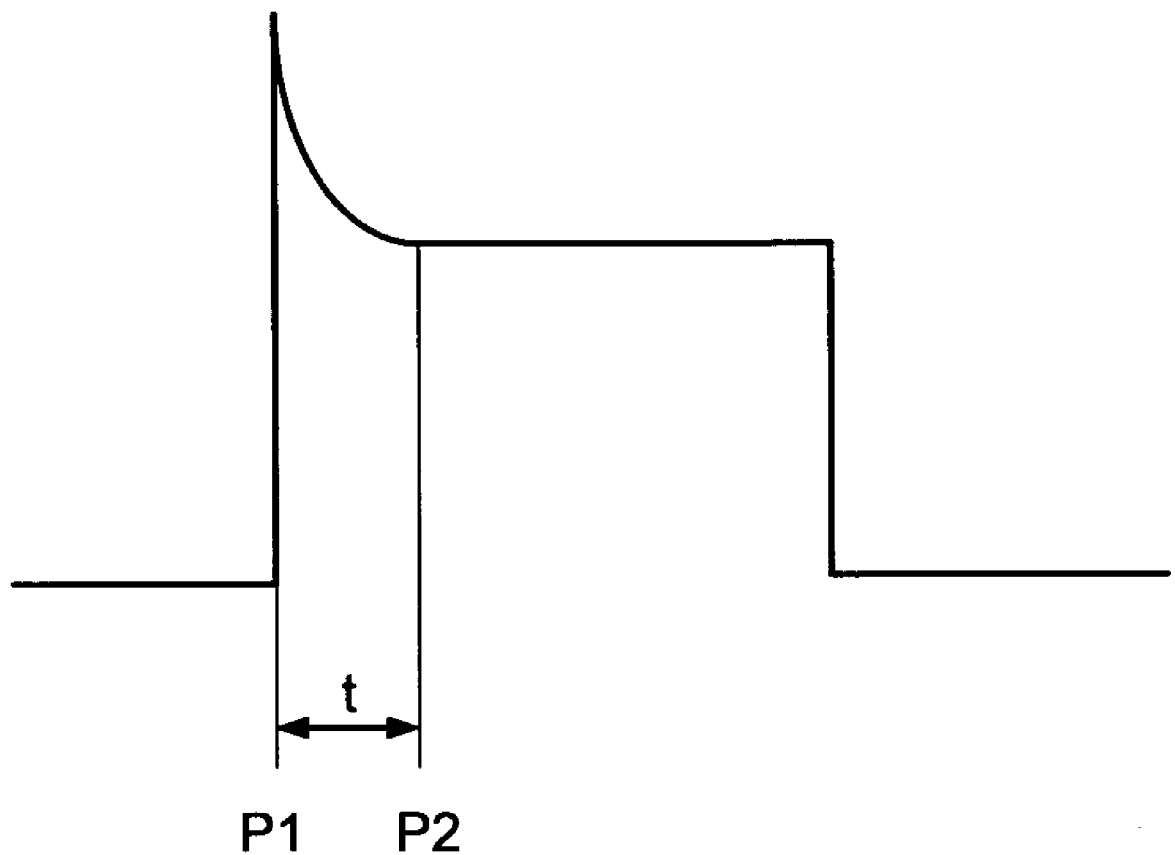
FIG. 8 is a diagram for explaining timing for detecting a reflection intensity.

The fourth embodiment will be explained using FIGS. 7 and 8. FIG. 7 is a block diagram of an optical recording device according to the fourth embodiment. This optical recording device includes a microcomputer 6a instead of the microcomputer 6 of the optical recording device shown in FIG. 3.

As explained in connection with the first embodiment, the optical pickup 2 includes a photo-detector that detects a reflection intensity of reflected light from the optical disk 1. As shown in FIG. 8, since a mark is not yet formed on the optical disk at a point P1 when power is switched to recording power, a reflection intensity at the point P1 is at a high level. Thereafter, when formation of a mark begins, reflectivity changes and the reflection intensity falls. Thereafter, the reflection intensity keeps a stable level until time when the mark formation ends. The optical pickup 2 detects a reflection intensity at a point P2 when a predetermined time t, during which reflected light intensity stabilizes, has elapsed since power is switched to the recording power and outputs the detected reflection intensity to the microcomputer 6a.

The microcomputer 6a includes a function of the running OPC in addition to the functions of the microcomputer 6 shown in FIG. 3. The microcomputer 6a stores a reflection intensity at the time of optimum recording power obtained by OPC processing and, at the time of a recording operation, compares the reflection intensity at the time of the optimum recording power and a reflection intensity at the time of the recording operation and controls the recording power such that the reflection intensity at the time of the recording operation is equal to the reflection intensity at the time of optimum recording power. In other words, the microcomputer 6a increases the recording power when the reflection intensity at the time of recording is smaller than the reflection intensity at the time of the optimum recording power and decreases the recording power when the reflection intensity at the time of recording is larger than the reflection intensity at the time of the optimum recording power to perform control such that the reflection intensity at the time of optimum recording power and the reflection intensity at the time of recording becomes equal. The comparison may be performed as the occasion arises, at every predetermined time, for each predetermined track, or at the time when a mark of 14T, which is a synchronization pattern, is formed.

Next, a spherical aberration correction operation performed by the optical recording device according to the fourth embodiment will be explained with reference to flowcharts in FIGS. 9 to 11. The microcomputer 6a causes the OPC circuit 7 to execute OPC processing to acquire an optimum recording power and a reflection intensity (step S600 in FIG. 9).

Figure 9:
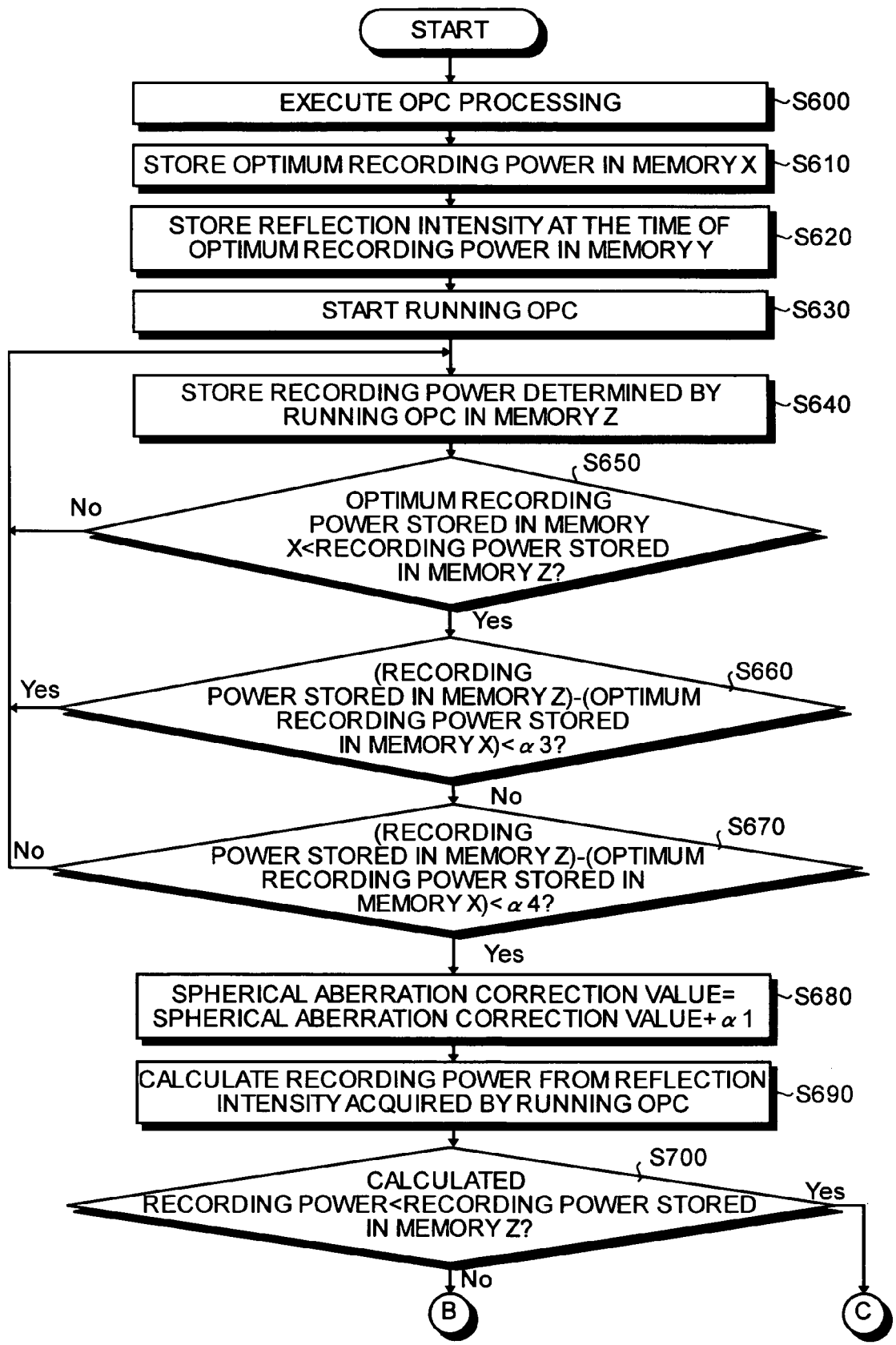
FIG. 9 is a flowchart for explaining a spherical aberration correction operation performed by the optical recording device according to the fourth embodiment.

The microcomputer 6a stores the acquired optimum recording power in a memory X in the microcomputer 6a (step S610 in FIG. 9) and stores the reflection intensity at the time of the optimum recording power in a memory Y in the microcomputer 6a (step S620 in FIG. 9). The microcomputer 6a outputs an NRZI signal, which is preferably recorded in the optical disk 1, to the laser drive circuit 8 and starts a recording operation while executing the running OPC (step S630 in FIG. 9).

The microcomputer 6a determines a power that should be supplied to fill the recording power by the running OPC. More specifically, the microcomputer 6 compares the reflection intensity inputted from the optical pickup 2 and the reflection intensity of the optimum recording power stored in the memory Y in the microcomputer 6. The microcomputer 6a supplies a recording power for making the inputted reflection intensity and the reflection intensity stored in the memory Y in the microcomputer 6a equal and outputs the next NRZI signal and the supplied recording power to the laser drive circuit 8. Consequently, the recording power is changed. When the inputted reflection intensity and the reflection intensity stored in the memory Y in the microcomputer 6a coincide with each other, the microcomputer 6a judges that a recording operation is performed in the same state as at the time when the optimum recording power is determined and does not change the recording power from the optimum recording power. In this way, the microcomputer 6a determines a power that is preferably supplied to fill the recording power from the reflection intensity acquired by the running OPC processing and stores the filled recording power in a memory Z in the microcomputer 6a (step S640 in FIG. 9).

The microcomputer 6a compares the recording power stored in the memory Z in the microcomputer 6a and the optimum recording power stored in the memory X in the microcomputer 6 (step S650 in FIG. 9). If the recording power stored in the memory Z in the microcomputer 6 is equal to or smaller than the optimum recording power stored in the memory X in the microcomputer 6a (No at step S650 in FIG. 9), the microcomputer 6a continues the recording operation by the running OPC (steps S640 and S650 in FIG. 9).

If the recording power stored in the memory Z in the microcomputer 6a is larger than the optimum recording power stored in the memory X in the microcomputer 6a (Yes at step S650 in FIG. 9), the microcomputer 6a subtracts the optimum recording power stored in the memory X in the microcomputer 6a from the recording power stored in the memory Z in the microcomputer 6a to calculate a difference between the optimum recording power and present recording power. In other words, the microcomputer 6a calculates an amount of change between the present recording power and the optimum recording power. Then, the microcomputer 6 compares the amount of change and a predetermined value $\alpha 3$ ($0<\alpha 3$) (step S660 in FIG. 9). As a result of the comparison, if the amount of change is smaller than the predetermined value $\alpha 3$ (Yes at step S660 in FIG. 9), the microcomputer 6a judges that the recording power changed by the running OPC is within an allowable range and continues the recording operation by the running OPC without performing spherical aberration correction processing (steps S640 to S660 in FIG. 9).

If the amount of change is equal to or larger than the predetermined value $\alpha 3$ (No at step S660 in FIG. 9), the microcomputer 6a compares the amount of change and a predetermined value $\alpha 4$ ($\alpha 3<\alpha 4$) (step S670 in FIG. 9). As a result of the comparison, if the amount of change is equal to or larger than the predetermined value $\alpha 4$ (No at step S670 in FIG. 9), the microcomputer 6a continues the recording operation by the running OPC without performing the spherical aberration correction processing (steps S640 to S670 in FIG. 9). In general, since a spherical aberration in an optical disk is caused by an error in thickness of a transparent substrate, recording power changes slowly. Therefore, the microcomputer 6a judges whether an amount of change in the recording power has increased rapidly or is increasing slowly by comparing the amount of change with the predetermined value $\alpha 4$. If the amount of change in the recording power has increased rapidly, the microcomputer 6 judges that the change is a temporary change due to an influence of a fingerprint or dust adhered to the optical disk 1 and continues the recording operation by the running OPC without performing the spherical aberration correction processing.

If the amount of change is smaller than the predetermined value $\alpha 4$ (Yes at step S670 in FIG. 9), the microcomputer 6a judges that the recording power changed by the running OPC is outside the allowable range and the change is a change due to a spherical aberration and performs the spherical aberration correction processing.

The microcomputer 6a adds the predetermined value $\alpha 1$ ($0<\alpha 1$) to a present spherical aberration correction value to change the spherical aberration correction value (step S680 in FIG. 9). Since the recording operation is performed at this point, it is desirable that the predetermined value $\alpha 1$ is a minimum value unit of the spherical aberration correction value. However, the predetermined value $\alpha 1$ is not so limited.

Based on a reflection intensity inputted from the optical pickup 2 by the running OPC after the spherical aberration correction value is changed and a reflection intensity at the time of the optimum recording power is stored in the memory Y in the microcomputer 6a, the microcomputer 6a calculates a recording power for making the inputted reflection intensity equal to the reflection intensity at the time of the optimum recording power stored in the memory Y in the microcomputer 6a (step S690 in FIG. 9). The microcomputer 6a compares the calculated recording power and the optimum recording power stored in the memory X in the microcomputer 6a (step S700 in FIG. 9). As a result of the comparison, if the calculated recording power is equal to or larger than the recording power stored in the memory Z in the microcomputer 6a (No at step S700 in FIG. 9), the microcomputer 6a subtracts the predetermined value $\alpha 1$ from the spherical aberration correction value to change the spherical aberration correction value (step S710 in FIG. 10). For the first subtraction only, the microcomputer 6 subtracts $2\alpha 1$. For subsequent subtractions, the spherical aberration correction value is changed by subtracting the predetermined value $\alpha 1$ from a spherical aberration correction value obtained at the time when the recording power stored in the memory Z in the microcomputer 6a is calculated.

Figure 10:
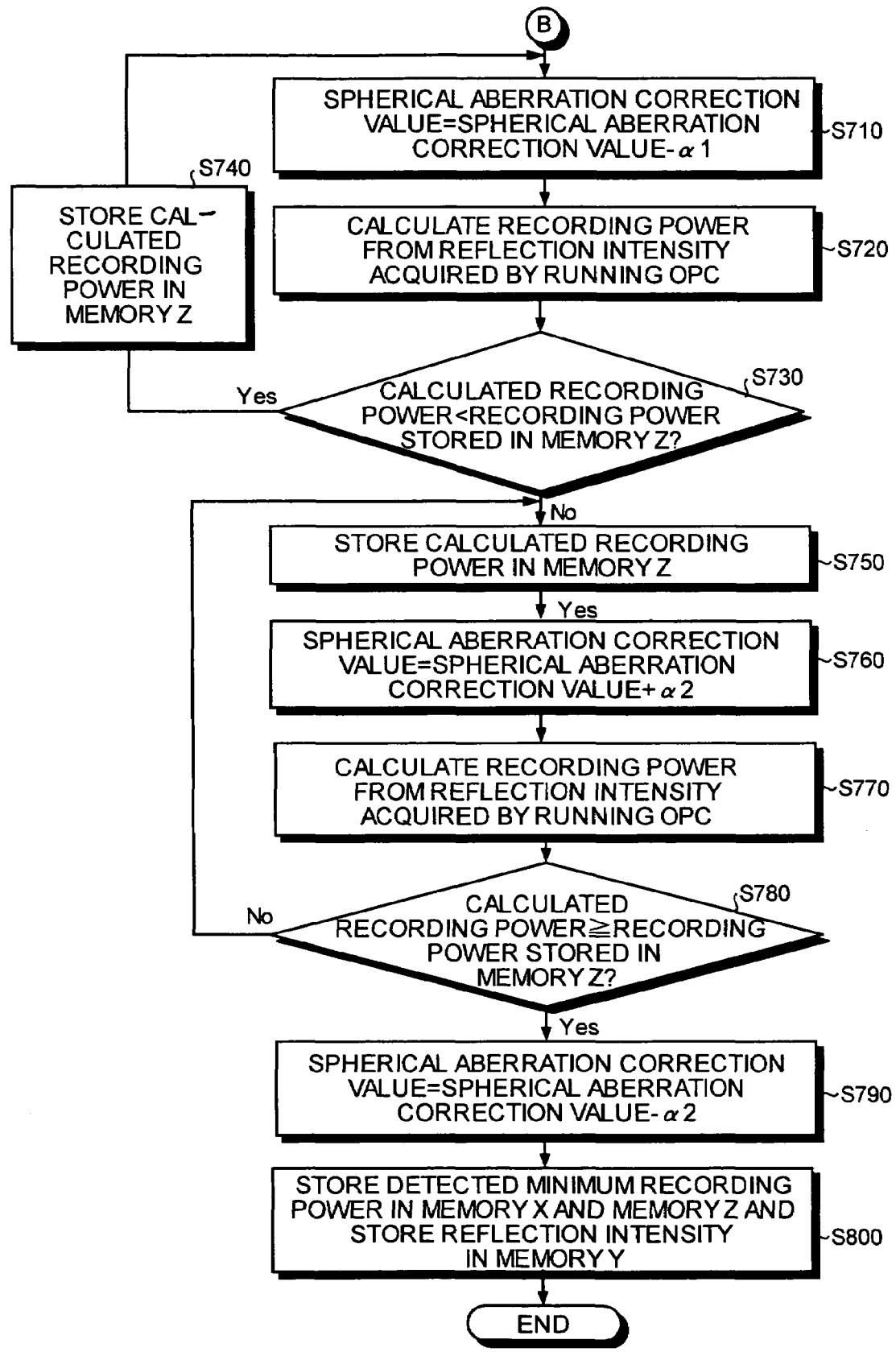
FIG. 10 is a continuation of the flowchart in FIG. 9.

The microcomputer 6a calculates recording power based on the reflection intensity acquired by the running OPC after subtracting the predetermined value $\alpha 1$ from the present spherical aberration correction value to change the spherical aberration correction value (step S720 in FIG. 10). The microcomputer 6a compares the calculated recording power and the recording power stored in the memory Z in the microcomputer 6a (step S730 in FIG. 10). If the calculated recording power is smaller than the recording power stored in the memory Z in the microcomputer 6a (Yes at step S730 in FIG. 10), the microcomputer 6a repeats the operations of storing the calculated recording power in the memory Z in the microcomputer 6a (step S740 in FIG. 10), calculating recording power from the acquired reflection intensity after subtracting the predetermined value $\alpha 1$ from the present spherical aberration correction value to change the spherical aberration correction value, and comparing the calculated recording power and the recording power stored in the memory Z in the microcomputer 6a until the calculated recording power becomes equal to or larger than the recording power stored in the memory Z in the microcomputer 6a (steps S710 to S740 in FIG. 10). In other words, the microcomputer 6a calculates a recording power from a reflection intensity acquired by decreasing the spherical aberration correction value by increments of the predetermined value $\alpha 1$ to detect a minimum value of the recording power.

If the calculated recording power becomes equal to or larger than the recording power stored in the memory Z in the microcomputer 6a (No at step S730 in FIG. 10), the microcomputer 6a stores the calculated recording power in the memory Z in the microcomputer 6a (step S750 in FIG. 10). Then, the microcomputer 6a adds the predetermined value $\alpha 2$ ($0<\alpha 2\leq \alpha 1$, $\alpha 2$ is an integer) to the present spherical aberration correction value to change the spherical aberration correction value (step S760 in FIG. 10). In other words, the microcomputer 6a changes the spherical aberration correction value by adding $\alpha 2$ to the spherical aberration correction value at the time when the recording power stored in the memory Z in the microcomputer 6a is calculated.

The microcomputer 6a calculates recording power based on the reflection intensity acquired by the running OPC after changing the spherical aberration correction value (step S770 in FIG. 10). The microcomputer 6a compares the calculated recording power and the recording power stored in the memory Z in the microcomputer 6a (step S780 in FIG. 10). If the calculated recording power is smaller than the recording power stored in the memory Z in the microcomputer 6a (No at step S780 in FIG. 10), the microcomputer 6a repeats the operations of storing the calculated recording power in the memory Z in the microcomputer 6a, calculating recording power based on the reflection intensity acquired by the running OPC after adding the predetermined value α2 to the present spherical aberration correction value to change the spherical aberration correction value, and comparing the calculated recording power and the recording power stored in the memory Z in the microcomputer 6a until the calculated recording power becomes equal to or larger than the recording power stored in the memory Z in the microcomputer 6a (steps S750 to S780 in FIG. 10). In other words, the microcomputer 6a calculates a recording power from the reflection intensity acquired by increasing the spherical aberration correction value by increments of the predetermined value α2 to detect a minimum value of the recording power.

If the calculated recording power becomes equal to or larger than the recording power stored in the memory Z in the microcomputer 6a (Yes at step S780 in FIG. 10), the microcomputer 6a subtracts the predetermined value α2 from the present spherical aberration correction value to change the spherical aberration correction value (step S790 in FIG. 10). In other words, the microcomputer 6a changes the spherical aberration correction value by subtracting α2 from the spherical aberration correction value at the time when the minimum recording power stored in the memory Z in the microcomputer 6a is calculated. The microcomputer 6a stores the detected minimum recording power in the memory X and the memory Z in the microcomputer 6a and stores the reflection intensity of the detected minimum recording power in the memory Y (step S800 in FIG. 10). The microcomputer 6a performs a recording operation with the detected minimum recording power and repeats the spherical aberration correction by the running OPC until the recording operation ends.

Figure 11:
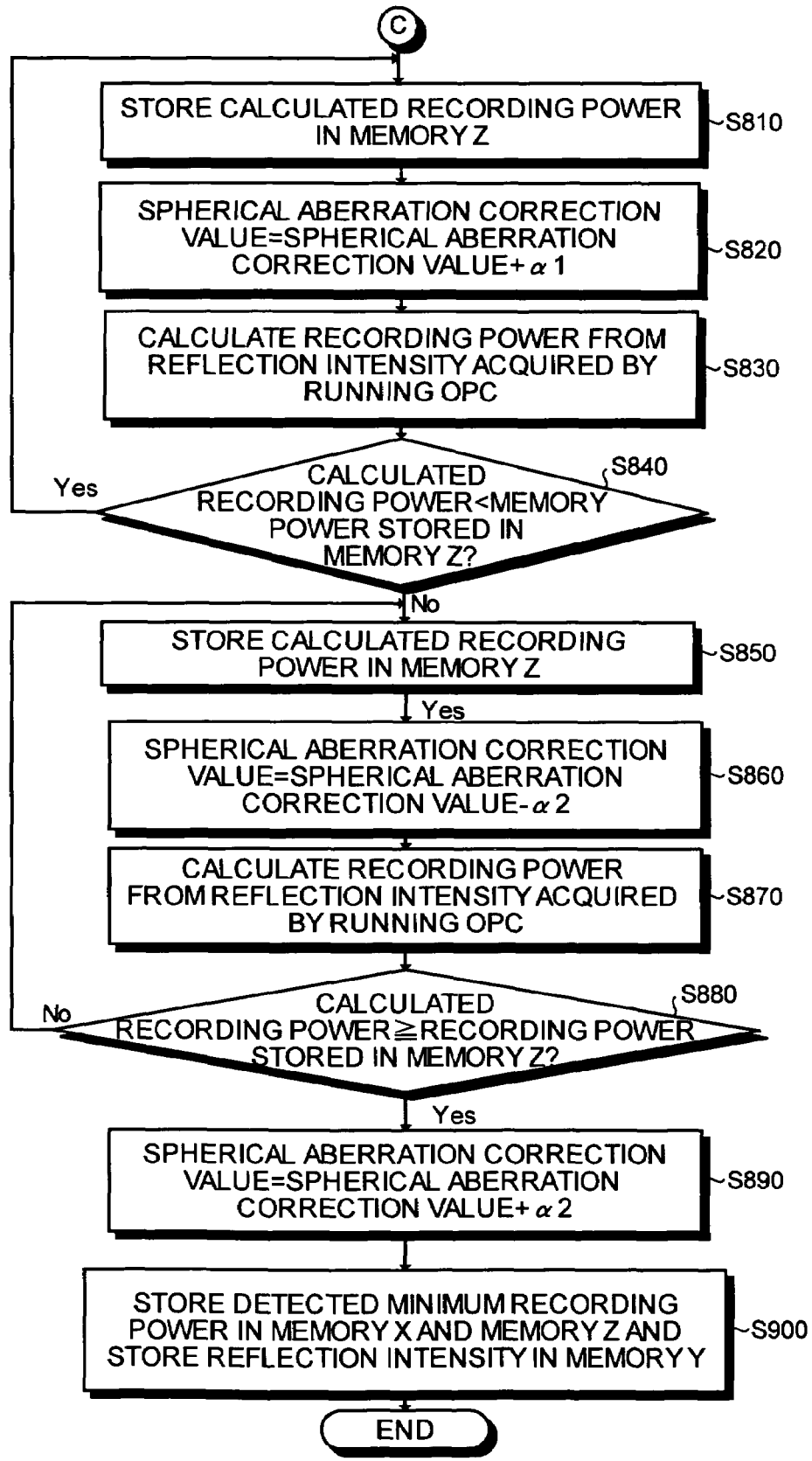
FIG. 11 is a continuation of the flowchart in FIG. 9.

On the other hand, if the recording power calculated from the reflection intensity acquired at the time when the spherical aberration correction processing is started is smaller than the recording power stored in the memory Z in the microcomputer (Yes at step S700 in FIG. 9), the microcomputer 6a stores the calculated recording power in the memory Z in the microcomputer 6a (step S810 in FIG. 11). The microcomputer 6a adds the predetermined value α1 to the present spherical aberration correction value to change the spherical aberration correction value (step S820 in FIG. 11).

The microcomputer 6a calculates a recording power based on the reflection intensity acquired by the running OPC after changing the spherical aberration correction value (step S830 in FIG. 11). The microcomputer 6a compares the calculated recording power and the recording power stored in the memory Z in the microcomputer 6a (step S840 in FIG. 11). If the calculated recording power is smaller than the recording power stored in the memory Z in the microcomputer 6a (step S840 in FIG. 11), the microcomputer 6a repeats the operations of storing the calculated recording power in the memory Z in the microcomputer 6a and comparing the recording power, which is calculated based on the reflection intensity acquired by the running OPC after adding the predetermined value α1 to the present spherical aberration correction value to change the spherical aberration correction value, and the recording power stored in the memory Z in the microcomputer 6a until the calculated recording power becomes equal to or larger than the recording power stored in the memory Z in the microcomputer 6 (steps S810 to S840 in FIG. 11). In other words, the microcomputer 6a calculates recording power from a reflection intensity acquired by increasing the spherical aberration correction value by increments of the predetermined value α1 to detect a minimum value of the recording power.

If the calculated recording power becomes equal to or larger than the recording power stored in the memory Z in the microcomputer 6a (No at step S840 in FIG. 11), the microcomputer 6a stores the calculated recording power in the memory Z in the microcomputer 6a (step S850 in FIG. 11). Then, the microcomputer 6a subtracts the predetermined value α2 from the present spherical aberration correction value to change the spherical aberration correction value (step S860 in FIG. 11). In other words, the microcomputer 6a changes the spherical aberration correction value by subtracting α2 from the spherical aberration correction value at the time when the recording power stored in the memory Z in the microcomputer 6a is calculated (step S870 in FIG. 11).

The microcomputer 6a compares the recording power calculated based on the reflection intensity acquired after changing the spherical aberration correction value and the recording power stored in the memory Z in the microcomputer 6a (step S880 in FIG. 11). If the calculated recording power is smaller than the recording power stored in the memory Z in the microcomputer 6a (No at step S880 in FIG. 11), the microcomputer 6a repeats the operations of storing the calculated recording power in the memory Z in the microcomputer 6a and comparing the recording power, which is calculated based on the reflection intensity acquired after subtracting the predetermined value α2 from the present spherical aberration correction value to change the spherical aberration correction value, and the recording power stored in the memory Z in the microcomputer 6a until the calculated recording power becomes equal to or larger than the recording power stored in the memory Z in the microcomputer 6a (steps S850 to S880 in FIG. 11). In other words, the microcomputer 6a calculates recording power from the reflection intensity acquired by decreasing the spherical aberration correction value by increments of the predetermined value α2 to detect a minimum value of the recording power.

If the calculated optimum recording power becomes equal to or larger than the recording power stored in the memory Z in the microcomputer 6a (Yes at step S880 in FIG. 11), the microcomputer 6a adds the predetermined value α2 to the present spherical aberration correction value to change the spherical aberration correction value (step S890 in FIG. 11). In other words, the microcomputer 6a changes the spherical aberration correction value by adding α2 to the spherical aberration correction value at the time when the minimum recording power stored in the memory Z in the microcomputer 6a is acquired. The microcomputer 6a stores the detected minimum recording power in the memory X and the memory Z in the microcomputer 6a and stores a reflection intensity of the detected minimum recording power in the memory Y (step S900 in FIG. 11). The microcomputer 6a performs a recording operation with the detected minimum recording power and repeats the spherical aberration correction by the running OPC until the recording operation ends.

In this way, in this fourth embodiment, the microcomputer 6a executes the running OPC to monitor recording power during recording and, when the recording power during recording becomes larger than an allowable range of an optimum recording power, changes a spherical aberration correction value to perform spherical aberration correction such that the recording power is minimized. Thus, spherical aberration that has occurred during the recording can be corrected.

In addition, the microcomputer 6a usually operates with firmware. If this firmware includes the function of the running OPC, the microcomputer 6a can perform spherical aberration correction during a recording operation only by changing the firmware without wasting an OPC area.

Note that, in this fourth embodiment, the microcomputer 6a compares optimum recording power acquired by the OPC processing and recording power calculated from a reflection intensity acquired by the running OPC to detect an increase in recording power. However, a method of detecting an increase in recording power is not so limited. For example, the microcomputer 6a may store calculated recording power to compare an amount of change in the recording power and detect an increase in the recording power.

In addition, in this fourth embodiment, the embodiment is explained referring to the example in which the microcomputer 6a acquires an optimum recording power and a reflection intensity at the time of the optimum recording power with the OPC processing when recording is started. However, a method of acquiring an optimum recording power and a reflection intensity of the optimum recording power at the time when recording is started is not so limited. In some optical disks, for example, various kinds of information are recorded on the optical disks, such as a pre-write section in the case of a DVD-R and ATIP information in the case of a CD. When optimum recording power at the time of recording is recorded in an optical disk as information, the microcomputer 6a may use the recorded optimum recording power as the optimum recording power at the time when recording is started, or may perform the spherical aberration correction processing during recording by the running OPC after executing the spherical aberration correction processing shown in the flowchart in FIG. 4, FIG. 5, or FIG. 6 to perform spherical aberration correction before starting the recording.

Moreover, the microcomputer 6a may perform detailed spherical aberration correction with the running OPC after correcting a spherical aberration based on signals obtained from respective disks like pre-write jitter of a DVD-R, emboss pit jitter of a DVD-RW, an LPP signal of the DVD-R or the DVD-RW, an RF signal, a push-pull level, wobble of the DVD-R, the DVD-RW, a DVD+R, or a DVD+RW, and a CAPA signal of a DVD-RAM.

Furthermore, when an optimum spherical aberration correction value at optimum recording power at the time of recording and an optimum spherical aberration correction value using an RF signal, an LPP signal, or the like at the time of reproduction are different and when deviation of the values is a fixed value, the microcomputer 6a may determine a spherical aberration correction value taking into account this fixed value.

In addition, in determining the spherical aberration correction value in the first embodiment to the fourth embodiment, focus offsets and tracking offsets may be combined such that the conditions become optimal.

Moreover, the liquid crystal panel is used as an aberration correcting unit in the first to the third embodiment. However, the aberration correcting unit is not so limited, and other means may be used, such as a method according to a combination of lenses. For example, the aberration correcting unit may be a collimator lens and an expander lens, which corrects a spherical aberration by changing a relative position with respect to an object lens in an optical axis direction to change a degree of divergence or a degree of convergence of incident light beams of a laser beam on the object leans.

Figure 12:
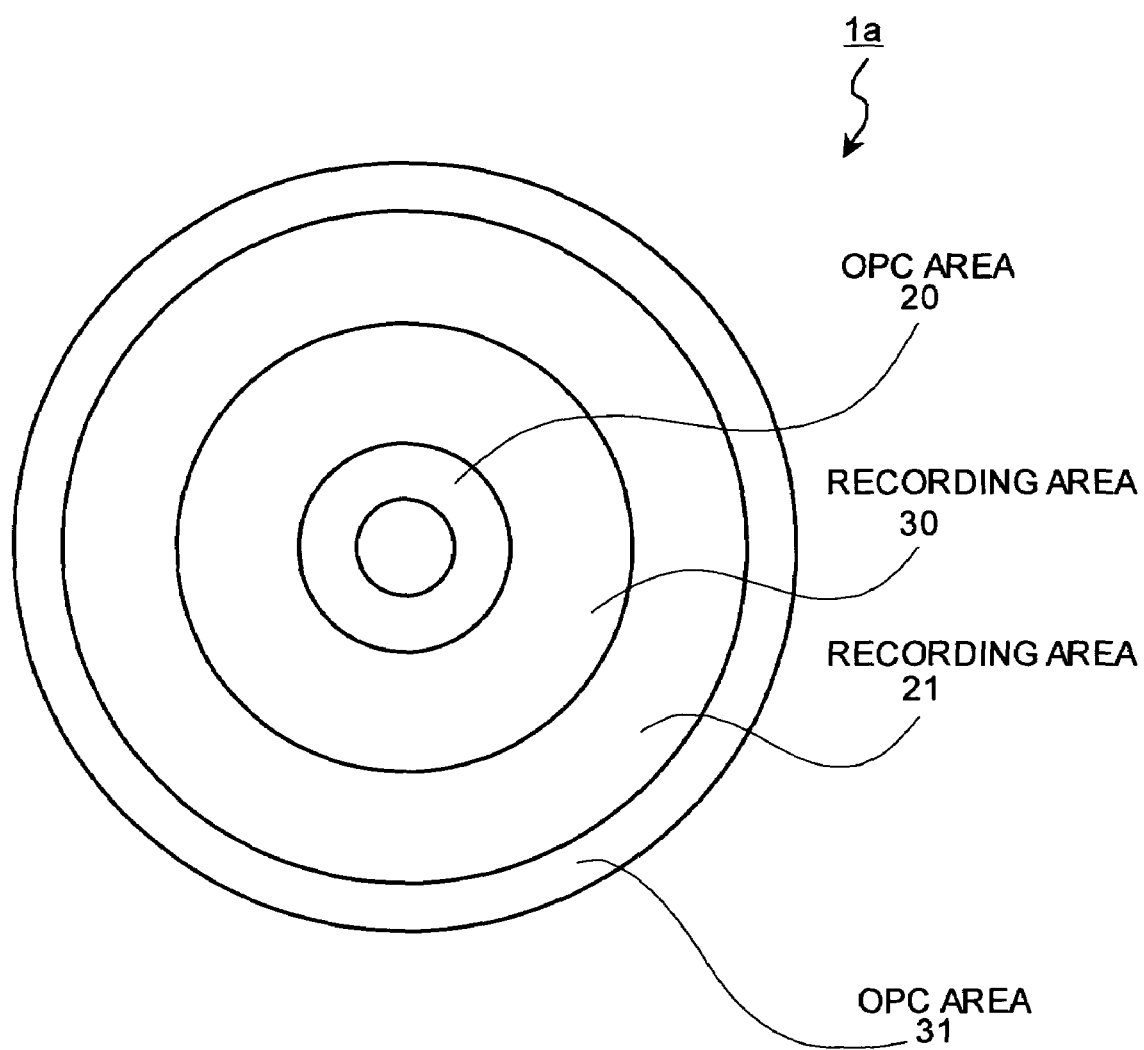
FIG. 12 is a schematic diagram of an example of an optical disk having plural OPC areas.

In the first to the third embodiments, an optical disk is explained as having an OPC area in one location in the optical disk. However, one optical disk may have OPC areas in a plurality of locations in the optical disk to cope with a case in which thickness of a transparent substrate is not uniform on one optical disk and a case in which an optical disk has a plurality of recording layers. For example, as shown in FIG. 12, an optical disk 1a having multiple (in this case, two) OPC areas 20 and 21 is possible. In the optical disk 1a having multiple OPC areas, the microcomputer 6 uses an optimum recording power at the time when the OPC processing is executed in the OPC area 20 to record information in a recording area 30 adjacent to this OPC area 20 and uses an optimum recording power at the time when the OPC processing is executed in the OPC area 21 to record information in a recording area 31 adjacent to this OPC area 21. This makes it possible to adjust an optimum recording power according to a change in thickness of a transparent substrate of the optical disk 1a. In addition, in the case of the optical disk having multiple layers, the optical disk has at least one OPC area for each layer, which makes it possible to adjust an optimum recording power for each layer.

Figure 4:
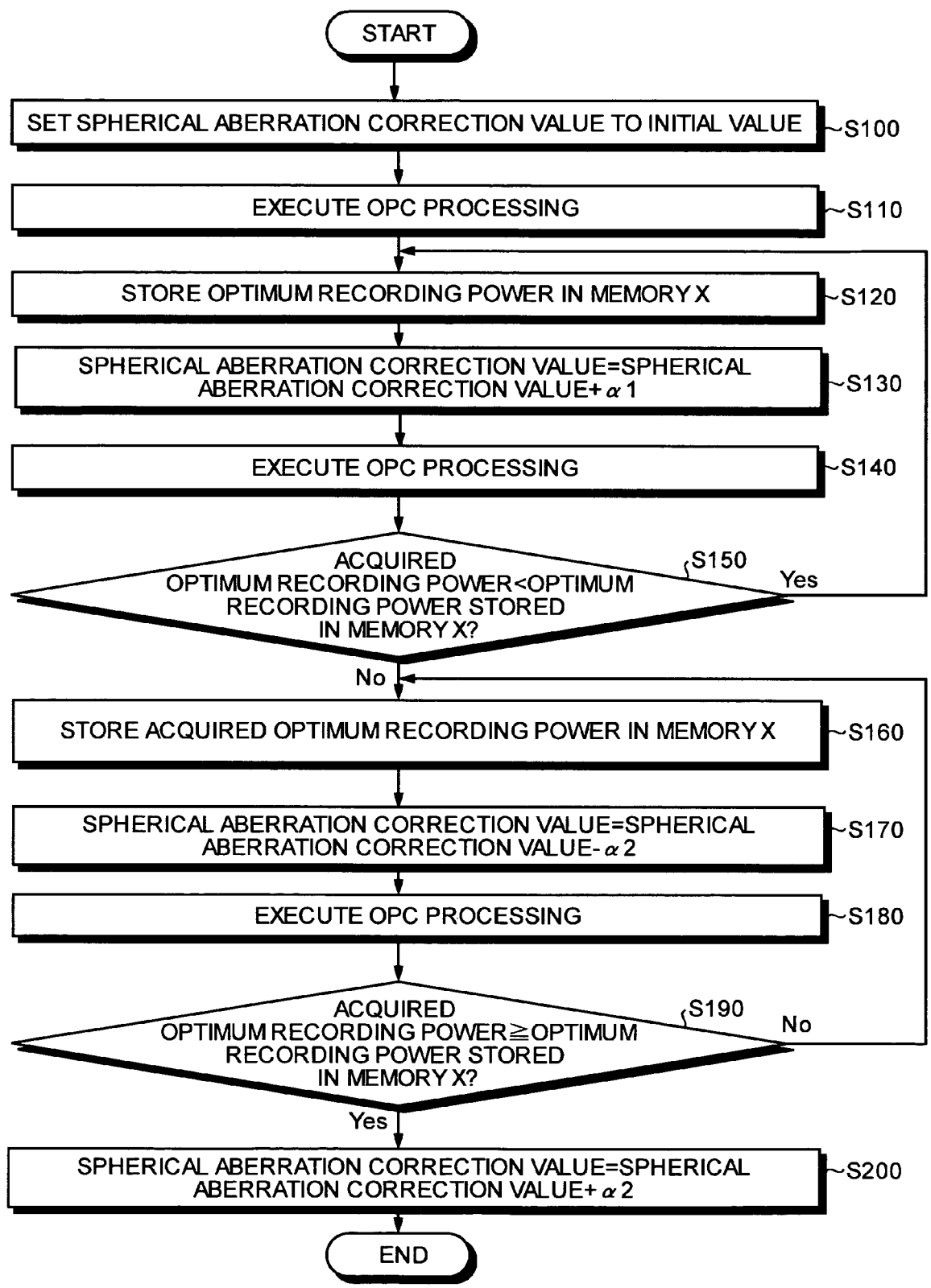
FIG. 4 is a flowchart for explaining a spherical aberration correction operation performed by the optical recording device shown in FIG. 3.

When the optical disk 1a having multiple OPC areas in this way is inserted in an optical recording device, the microcomputer 6 performs the spherical aberration correction processing shown in the flowchart of FIG. 4, FIG. 5, or FIG. 6 in all of the OPC areas of the optical disk 1a and uses optimum recording powers and spherical aberration correction values acquired in the respective OPC areas to record information in recording areas corresponding to the respective OPC areas.

More specifically, when the optical disk 1a is inserted in the optical recording device, the microcomputer 6 executes the spherical aberration correction processing shown in the flowchart of FIG. 4, FIG. 5, or FIG. 6 in the OPC area 20 to acquire a minimum value of an optical recording power and a spherical aberration correction value in the OPC area 20 and stores the minimum value of the optical recording power and the spherical aberration correction value in a memory in the microcomputer 6. Next, the microcomputer 6 executes the spherical aberration correction processing shown in the flowchart of FIG. 4, FIG. 5, or FIG. 6 in the OPC area 21 to acquire a minimum value of the optimum recording power and a spherical aberration correction value in the OPC area 21 and stores the minimum value of the optimum recording power and the spherical aberration correction value in the memory in the microcomputer 6.

When the microcomputer 6 records information in the recording area 30, the microcomputer 6 uses the minimum value of the optimum recording power and the spherical aberration correction value acquired in the OPC area 20 that are stored in the memory in the microcomputer 6. When the microcomputer 6 records information in the recording area 31, the microcomputer 6 uses the minimum value of the optimum recording power and the spherical aberration correction value acquired in the OPC area 21 that are stored in the memory in the microcomputer 6.

When the microcomputer 6 performs the spherical aberration correction for each OPC area of an optical disk to determine a spherical aberration correction value and records information in recording areas corresponding to the respective OPC areas, the microcomputer 6 performs the spherical aberration correction according to the spherical aberration correction value determined in the respective OPC areas. Thus, the microcomputer 6 can perform the spherical aberration correction corresponding to the recording areas of the optical disk.

In addition, when the optical disk 1a having plural OPC areas is inserted in the optical recording device, the microcomputer 6 executes the OPC processing in all of the OPC areas of the optical disk 1a to acquire an optimum recording power in the respective OPC areas. The microcomputer 6 may perform the spherical aberration correction processing shown in the flowchart of FIG. 4, FIG. 5, or FIG. 6 using the OPC area where the optimum recording power of the minimum value is detected.

More specifically, when the optical disk 1a is inserted in the optical recording device, the microcomputer 6 executes the OPC processing in the OPC areas 20 and 21 to acquire an optimum recording power in the OPC areas 20 and 21, respectively. The microcomputer 6 compares the acquired optimum recording powers to acquire a minimum optimum recording power. The microcomputer 6 performs the spherical aberration correction processing shown in the flowchart of FIG. 4 using the OPC area where the minimum optimum recording power is acquired.

Alternatively, the microcomputer 6 stores the minimum optimum recording power in the memory X in the microcomputer 6. As a result, the microcomputer 6 ends the processing at steps S300 and S310 in FIG. 5. Thereafter, the microcomputer 6 performs the spherical aberration correction processing with the minimum value of the optimum recording power as a parameter by changing the spherical aberration correction value as shown at steps S320 to S520 in the flowcharts of FIGS. 5 and 6 in the OPC area where the minimum recording power is acquired.

In this way, in the case of the optical disk having multiple OPC areas, if the microcomputer 6a executes the OPC processing in the respective OPC areas to detect a minimum optimum recording power and calculates a spherical aberration correction value using the detected minimum optimum recording power and the OPC area where the minimum optimum recording power is acquired, the microcomputer 6 can perform the spherical aberration correction without wasting the OPC areas.

In addition, when the optical disk 1a having multiple OPC areas is inserted in the optical recording device, the microcomputer 6a may perform the spherical aberration correction processing by the running OPC at steps S630 to S900 shown in the flowcharts of FIGS. 9 to 11 as an initial value in executing the OPC processing in all of the OPC areas of the optical disk 1a, acquiring and storing optimum recording powers and reflection intensities in the respective OPC areas, and recording information in recording areas corresponding to the OPC areas.

More specifically, when the optical disk 1a is inserted in the optical recording device, the microcomputer 6a executes the OPC processing in the OPC area 20 to acquire an optimum recording power and a reflection intensity in the OPC area 20 and stores the optimum recording power and the reflection intensity in a memory in the microcomputer 6a. Next, the microcomputer 6a executes the OPC processing in the OPC area 21 to acquire an optimum recording power and a reflection intensity in the OPC area 21 and stores the optimum recording power and the reflection intensity in the memory in the microcomputer 6a.

When the microcomputer 6a records information in the recording area 30 corresponding to the OPC area 20, the microcomputer 6a stores the optimum recording power in the OPC area 20, which is stored in the memory in the microcomputer 6a, in the memory X in the microcomputer 6a and stores the reflection intensity in the OPC area 20, which is stored in the memory in the microcomputer 6a, in the memory Y in the microcomputer 6a. Consequently, the optimum recording power and the reflection intensity in the recording area 30 are stored as initial values. The microcomputer 6a performs the spherical aberration correction processing by the running OPC at steps S630 to S900 shown in the flowcharts of FIGS. 9 to 11.

When the microcomputer 6a records information in the recording area 31 corresponding to the OPC area 21, the microcomputer 6a stores the optimum recording power in the OPC area 21, which is stored in the memory in the microcomputer 6a, in the memory X in the microcomputer 6a and stores the reflection intensity in the OPC area 21, which is stored in the memory in the microcomputer 6a, in the memory Y in the microcomputer. Then, the microcomputer 6a performs the spherical aberration correction processing by the running OPC at steps S630 to S900 shown in the flowcharts of FIGS. 9 to 11.

In this way, when the microcomputer 6a records information in a recording area, the microcomputer 6a executes the running OPC with an optimum recording power in an OPC area corresponding to a recording area in which the information is recorded and a reflection intensity at the time of irradiation of the optimum recording power as initial values to monitor power during the recording. Further, when the recording power during the recording becomes larger than an allowable range of the optimum recording power, the microcomputer 6a changes a spherical aberration correction value to perform spherical aberration correction such that the recording power is minimized. Consequently, it is possible to correct a spherical aberration that corresponds to a recording area in an optical disk and has occurred during the recording.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical recording device comprising:
    an optical pickup unit including a laser beam source that generates a laser beam, an optical system that irradiates the laser beam on an optical recording medium, and an aberration correcting unit that corrects wavefront aberrations produced in the optical system and the optical recording medium;
    a detecting unit that detects an optimum recording power of the laser beam with respect to the optical recording medium; and
    a controlling unit that controls the aberration correcting unit such that the optimum recording power to be detected by the detecting unit is at a minimum,
    wherein the detecting unit detects the optimum recording power based on reproduction signals of trial writing data recorded with changing recording powers in a predetermined area of the optical recording medium,
    wherein the aberration correcting unit corrects the wavefront aberrations based on an aberration correction value,
    wherein the controlling unit sets an initial value of the aberration correction value to a value at which the optimum recording power decreases by variably changing the aberration correction value, and
    wherein the controlling unit detects the aberration correction value at which the optimum recording power is at a minimum by variably changing the aberration correction value by one or more first predetermined increments from the initial value.

2. The optical recording device according to claim 1, wherein, when the optimum recording power increases due to an increase of the aberration correction value by the first predetermined increment, the controlling unit detects the aberration correction value at which the optimum recording power is at a minimum by decreasing the aberration correction value by one or more second predetermined increments, the second predetermined increment being smaller than the first predetermined increment.

3. The optical recording device according to claim 2, wherein, when the optimum recording power increases due to the increase or decrease of the aberration correction value by the second predetermined increment, the controlling unit stops increasing or decreasing the aberration correction value by the second predetermined increment.

4. The optical recording device according to claim 1, wherein the controlling unit sets the initial value of the aberration correction value to a value at which the optimum recording power decreases by decreasing the aberration correction value, and wherein the controlling unit detects the aberration correction value at which the optimum recording power is at a minimum by decreasing the aberration correction value by one or more first predetermined increments.

5. The optical recording device according to claim 4, wherein, when the optimum recording power increases due to the decrease of the aberration correction value by the first predetermined increment, the controlling unit detects the aberration correction value at which the optimum recording power is at a minimum by increasing the aberration correction value by one or more second predetermined increments, the second predetermined increment being smaller than the first predetermined increment.

6. The optical recording device according to claim 5, wherein, when the optimum recording power increases due to the increase or decrease of the aberration correction value by the second predetermined increment, the controlling unit stops increasing or decreasing the aberration correction value by the second predetermined increment.

7. The optical recording device according to claim 1, wherein the optical pickup unit further includes a reflected light amount detecting unit that detects a reflected light amount of reflected light from the optical recording medium, and wherein the controlling unit controls the aberration correcting unit such that the optimum recording power is minimized by correcting the optimum recording power based on the detected reflected light amount.

8. The optical recording device according to claim 1, wherein the detecting unit further includes a unit that detects an optimum recording power of the laser beam based on reproduction signals of trial writing data recorded with different recording powers in a plurality of predetermined areas corresponding to a plurality of recording areas of the optical recording medium, and wherein the controlling unit further includes a unit that controls the aberration correcting unit such that the respective optical recording powers detected in the respective predetermined areas are minimized.

9. An optical recording device comprising:

an optical pickup unit including a laser beam source that generates a laser beam, an optical system that irradiates the laser beam on an optical recording medium, and an aberration correcting unit that corrects wavefront aberrations produced in the optical system and the optical recording medium;

a detecting unit that detects an optimum recording power of the laser beam with respect to the optical recording medium; and a controlling unit that controls the aberration correcting unit such that the optimum recording power to be detected by the detecting unit is at a minimum, wherein the aberration correcting unit corrects the wavefront aberrations based on an aberration correction value, wherein, when an optimum recording power before increasing the aberration correction value by a first predetermined increment is smaller than a recording power after increasing the aberration correction value by the first predetermined increment, the controlling unit detects the aberration correction value at which the optimum recording power is at a minimum by decreasing the aberration correction value by one or more first predetermined increments, and wherein, when an optimum recording power after increasing the aberration correction value by the first predetermined increment is smaller than a recording power before increasing the aberration correction value by the first predetermined increment, the controlling unit detects the aberration correction value at which the optimum recording power is at a minimum by increasing the aberration correction value by one or more first predetermined increments.

10. The optical recording device according to claim 9, wherein, when the optimum recording power increases due to the increase of the aberration correction value by the first predetermined increment, the controlling unit detects the aberration correction value at which the optimum recording power is at a minimum by decreasing the aberration correction value by one or more second predetermined increments, the second predetermined increment being smaller than the first predetermined increment, and wherein, when the optimum recording power increases due to the decrease of the aberration correction value by the first predetermined increment, the controlling unit detects the aberration correction value at which the optimum recording power is at a minimum, by increasing the aberration correction value by one or more second predetermined increments.

11. The optical recording device according to claim 10, wherein, when the optimum recording power increases due to the increase or decrease of the aberration correction value by the second predetermined increment, the controlling unit stops increasing or decreasing the aberration correction value by the second predetermined increment.

12. An aberration correction method for an optical recording device that corrects wavefront aberrations of an optical system for irradiating a laser beam generated from a laser beam source on an optical recording medium, comprising:

detecting an optimum recording power of the laser beam with respect to the optical recording medium; and correcting the wavefront aberrations such that the optimum recording power to be detected at the detecting is at a minimum, said aberration correction method further comprising detecting a reflected light amount of reflected light from the optical recording medium, wherein the correcting of the wavefront aberrations includes correcting the wavefront aberrations such that the optimum recording power becomes a minimum by correcting the optimum recording power based on the detected reflected light amount.

13. The aberration correction method according to claim 12, wherein the detecting includes detecting the optimum recording power of the laser beam based on reproduction signals of trial writing data recorded with different recording powers in a plurality of predetermined areas corresponding to a plurality of recording areas of the optical recording medium, and wherein the correcting of the wavefront aberrations includes correcting the wavefront aberrations such that respective optimum recording powers to be detected are at a minimum in the respective predetermined areas.

* * * * *